(12) United States Patent
Okumura et al.

(10) Patent No.: US 7,880,395 B2
(45) Date of Patent: Feb. 1, 2011

(54) METHOD FOR RESTORING FUNCTION OF PLASMA DISPLAY PANEL AND PLASMA DISPLAY PANEL

(75) Inventors: Tomohiro Okumura, Kadoma (JP); Mitsuo Saitoh, Neyagawa (JP); Masashi Morita, Minoo (JP); Masaharu Terauchi, Nara (JP); Junko Asayama, Suita (JP)

(73) Assignee: Panasonic Corporation, Osaka (JP)

( * ) Notice: Subject to any disclaimer, the term of this patent is extended or adjusted under 35 U.S.C. 154(b) by 902 days.

(21) Appl. No.: 11/808,853

(22) Filed: Jun. 13, 2007

(65) Prior Publication Data

US 2007/0241691 A1 Oct. 18, 2007

Related U.S. Application Data

(62) Division of application No. 10/990,551, filed on Nov. 18, 2004, now abandoned.

(30) Foreign Application Priority Data

Nov. 19, 2003 (JP) .............................. 2003-388616
May 31, 2004 (JP) .............................. 2004-161925

(51) Int. Cl.
    *G09G 3/10* (2006.01)
(52) U.S. Cl. .................... 315/169.4; 315/115; 315/116; 313/15; 345/204

(58) Field of Classification Search ................. 438/115, 438/20; 445/25; 313/495–500, 309–311, 313/585–587, 15; 315/169.4, 115, 116; 345/204, 345/60, 63, 65, 66

See application file for complete search history.

(56) References Cited

U.S. PATENT DOCUMENTS

| 5,514,933 | A | * | 5/1996 | Ward et al. ................... 313/582 |
| 5,688,708 | A | | 11/1997 | Kato et al. |
| 5,861,713 | A | | 1/1999 | Kondo et al. |
| 5,987,923 | A | | 11/1999 | Ostendarp et al. |
| 6,376,813 | B1 | * | 4/2002 | Tsai et al. ................... 219/497 |
| 6,666,738 | B1 | | 12/2003 | Kado et al. |
| 6,765,347 | B2 | | 7/2004 | Kusunoki et al. |
| 6,940,218 | B2 | | 9/2005 | Koga et al. |
| 2003/0189532 | A1 | | 10/2003 | Mizobata |

FOREIGN PATENT DOCUMENTS

| JP | 7-320645 | 12/1995 |
| JP | 3073451 | 6/2000 |
| JP | 2000-348626 | 12/2000 |

* cited by examiner

*Primary Examiner*—Jacob Y Choi
*Assistant Examiner*—Ephrem Alemu
(74) *Attorney, Agent, or Firm*—Wenderoth, Lind & Ponack, L.L.P.

(57) ABSTRACT

A method for restoring the function of a plasma display panel according to the present invention restores a function of a plasma display panel by raising the temperature of the plasma display panel to 400° C. to 800° C.

8 Claims, 12 Drawing Sheets

METHOD FOR RESTORING FUNCTION OF PLASMA DISPLAY PANEL AND PLASMA DISPLAY PANEL

This application is a divisional of application Ser. No. 10/990,551, filed on Nov. 18, 2004, now abandoned.

BACKGROUND OF THE INVENTION (1) Field of the Invention

The present invention relates to a plasma display panel (PDP) and a method for restoring the function of a PDP, when it becomes deteriorated, the PDP being capable of being used as the display of wall-hanging color televisions and a variety of other information display devices for the reason that PDP is inexpensive to produce and is thin with a large, high-resolution screen.

(2) Description of the Related Art

Plasma display panels (hereinafter referred to also as PDP (s)) are roughly categorized into AC type and DC type in terms of their drive methods, whereas they are roughly divided into surface discharge type and counter discharge type in terms of their discharge methods. Nowadays, AC surface discharge PDPs are in the mainstream because PDPs of this type can have a high-definition screen and allow for easy and simple production. An attempt has been made to improve viewability and color reproducibility of the PDPs by increasing the luminance of display that utilizes phosphors.

For example, conventional PDPs include a technology in which phosphor layers are composed of a large number of granular phosphors, each being coated with a thin film made of translucent material whose refractive index is smaller than that of the phosphors (see Japanese Laid-Open Patent publication No. 7-320645). This conventional PDP is capable of producing the following effects: the display luminance is increased thanks to the improvement in the excitation efficiency, which is attributable to the fact that the reflection at the surface layer of the phosphors is reduced and that the transmittance of ultraviolet (UV) light into the phosphors is increased; and the decay of the phosphors can be prevented because the thin-films protect the phosphors from ions at the time of plasma discharge.

Meanwhile, for an AC-driven PDP, which uses a magnesium oxide film as a dielectric protective film, a PDP is known that prevents the degradation of electric characteristics by forming, on the magnesium oxide film, an anti-gas-absorbing film having an insulating property and a visible-light transmission property so as to prevent the magnesium oxide film from absorbing gas at the fabrication stage (see Japanese Laid-Open Patent publication No. 2000-348626). Since this PDP is capable of reducing the gas absorption of magnesium oxide as well as reducing the breakdown voltage by successively forming an anti-gas-absorbing film on the magnesium oxide film, it is possible to achieve the enhanced stability and improved performance of discharge.

Furthermore, there has been proposed a PDP fabrication method that includes a process in which: electrodes, which are formed on at least one of a pair of glass substrates, are covered with a dielectric layer; a protective layer for protecting such dielectric layer from discharge and a temporary protective film for temporarily protecting the surface of such protective film up until the panel assembling process, are formed on the surface of such dielectric layer; and after the one glass substrate and the other substrate are assembled into a panel, the temporary protective film is removed by generating plasma in the panel (see Japanese Patent No. 3073451). In this fabrication method, since the temporary protective film is successively formed on the protective film after such protective film is formed, no affected layer is formed on the surface of the protective film. Accordingly, it becomes possible for the plasma display panel to have a protective film with excellent discharge properties.

Meanwhile, it is known that wavelength shift and luminance degradation of phosphors occur when a PDP is sealed in the fabrication and assembling processes or after being used for a long period of time as a product. Such wavelength shift and luminance degradation are especially notable in blue phosphors out of the three color phosphors. In the case of wavelength shift, discoloration of luminescent colors occurs, whereas in the case of luminance degradation, luminescence intensity is reduced, both of which lead to the deterioration in display function.

Such deterioration in the display function of PDPs is assumed to occur because of one of the following factors: wavelength shift that occurs due to the OH group being bound to BAM (blue phosphor: an abbreviation of $BaMgAl_{10}O_{17}$) as a result of oxygen defect and luminance degradation due to the oxidization of $EU^{2+}$; and destruction of BAM structure due to (UV) light, i.e., due to lowered crystallinity. However, no proposal has been made about means for restoring a deteriorated display function of PDPs attributable to the above wavelength shift and luminance degradation.

The present invention has been conceived in view of the above conventional problem, and it is an object of the present invention to provide a method for restoring the function of a plasma display panel that can efficiently restore the display function of a plasma display panel when its display function is deteriorated due to wavelength shift and luminance degradation of phosphors, as well as to provide a plasma display panel that is equipped with means for efficiently restoring its deteriorated display function.

SUMMARY OF THE INVENTION

In order to achieve the above object, the method for restoring the function of a plasma display panel of the invention according to a first aspect is characterized in that it comprises restoring a function of a PDP by raising a temperature of at least a phosphor layer in the PDP to 400° C. to 800° C.

The invention according to a second aspect is characterized in that, in the method for restoring the function of a PDP according to the first aspect, the PDP is equipped with a heating element, and the temperature of at least the phosphor layer in the PDP is raised to 400° C. to 800° C. by energizing the heating element.

The method for restoring the function of a plasma display panel of the invention according to a third aspect is characterized in that it comprises restoring a function of a PDP by raising a temperature of a phosphor layer in the PDP to 400° C. to 800° C. through irradiation of light to the PDP.

The invention according to a fourth aspect is characterized in that, in the method for restoring the function of a PDP according to the third aspect, the light is irradiated to the phosphor layer from outside the PDP through a glass substrate and a dielectric layer in the PDP.

The method for restoring the function of a plasma display panel of the invention according to a fifth aspect is characterized in that it comprises restoring a PDP by raising a temperature of a phosphor layer in the PDP to 400° C. to 800° C. by inductively heating conductive particles through application of a high-frequency electric field to the PDP, the conductive particles being mixed, at a predetermined ratio, with phosphor particles that make up the phosphor layer.

The method for restoring the function of a plasma display panel of the invention according to a sixth aspect is characterized in that it comprises restoring a PDP by raising a temperature of a phosphor layer in the PDP to 400° C. to 800° C. by inductively heating dielectric particles through application of a high-frequency electric field to the PDP, the dielectric particles being mixed, at a predetermined ratio, with phosphor particles that make up the phosphor layer.

The plasma display panel of the invention according to a seventh aspect is characterized in that it comprises: a first substrate on which discharge electrodes and a first dielectric layer are formed, each of the discharge electrodes generating a display discharge and the first dielectric layer covering the discharge electrodes; and a second substrate on which the following are formed: address electrodes that are located orthogonally to the discharge electrodes; a second dielectric layer that covers the address electrodes; barrier ribs that are formed on the second dielectric layer; phosphor layers, each being formed in a concave portion between each two neighboring barrier ribs; and heating elements that are located close to the respective phosphor layers.

The invention according to an eighth aspect is characterized in that the heating elements according to the seventh aspect have a linear shape and are formed on the second substrate, each of the heating elements being located between each two neighboring address electrodes in parallel with the address electrodes and being embedded in the second dielectric layer.

The invention according to a ninth aspect is characterized in that the heating elements according to the seventh aspect have a linear shape and are located above the respective address electrodes in parallel with the address electrodes, the heating elements being embedded in the second dielectric layer.

The invention according to a tenth aspect is characterized in that, in the PDP according to the seventh aspect, each of the heating elements is formed at least as part of each of the barrier ribs.

The invention according to an eleventh aspect is characterized in that the PDP according to the seventh aspect further comprises: a control drive circuit that controls drive of the discharge electrodes and the address electrodes; and a heating element energization circuit that controls energization of the heating elements so that the heating elements heat the phosphor layers at a predetermined temperature for a predetermined time.

The invention according to a twelfth aspect is characterized in that the PDP according to the seventh aspect further comprises: a timer circuit that measures a panel drive time during which the PDP has been driven; a memory that stores a total drive time that is obtained by accumulating each panel drive time measured by the timer circuit, the total drive time being updated and stored into the memory every time the timer circuit newly measures a panel drive time; a function restoration key by which an instruction for energizing the heating element is inputted, the key being operated manually; a heating element energization circuit that energizes the heating elements when the function restoration key is operated; and a control unit operable to indicate that an operation of the function restoration key should be performed, when judging that the total drive time stored in the memory reaches a set time.

The invention according to a thirteenth aspect is characterized in that the PDP according to the seventh aspect further comprises: a timer circuit that measures a panel drive time during which the PDP has been driven; a memory that stores a total drive time that is obtained by accumulating each panel drive time measured by the timer circuit, said total drive time being updated and stored into the memory every time the timer circuit newly measures a panel drive time; a heating element energization circuit that energizes the heating elements; and a control unit operable to direct the heating element energization circuit to energize the heating elements when judging that the total drive time stored in the memory reaches a set time.

The invention according to a fourteenth aspect is characterized in that the PDP according to a thirteenth aspect further comprises a clock circuit that provides time information, wherein when a pre-set time is reached, the control unit directs the heating element energization circuit to energize the heating elements, based on the time information provided by the clock circuit.

The invention according to a fifteenth aspect is characterized in that in the PDP according to the eleventh aspect, the heating element energization circuit controls the energization of the heating element so that the phosphor layers are heated at 400° C. to 800° C., preferably 500° C. to 600° C., for 10 to 120 minutes, preferably 20 to 60 minutes.

The disclosure of Japanese Patent Application No. 2003-388616 filed on Nov. 19, 2003 and the disclosure of Japanese Patent Application No. 2004-161925 filed on May 31, 2004 including specification, drawings and claims are incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

The following describes the preferred embodiments of the present invention with reference to the drawings.

First Embodiment

Figure 1:
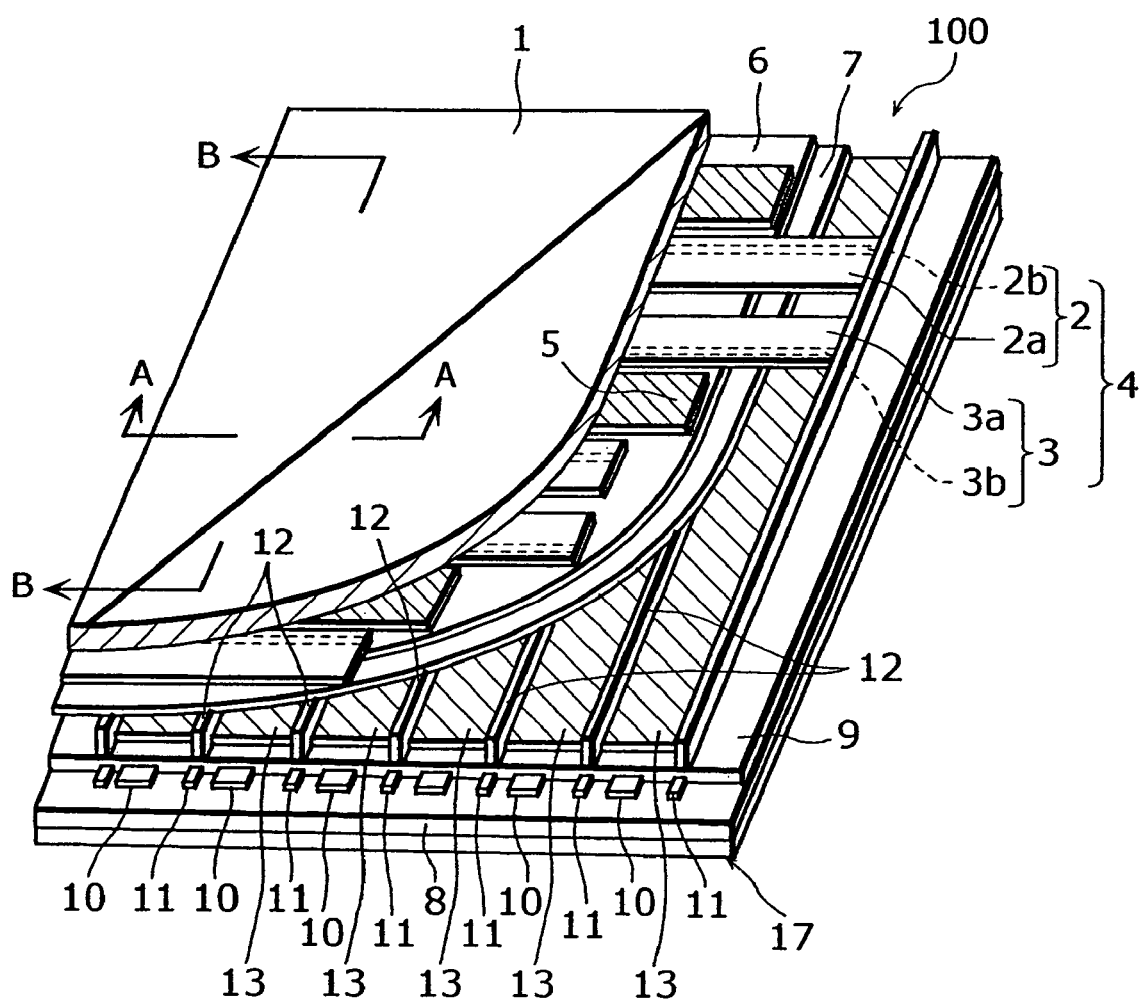
FIG. 1 is a cutaway perspective view showing a plasma display panel (PDP) according to a first embodiment of the present invention.
Figure 2:
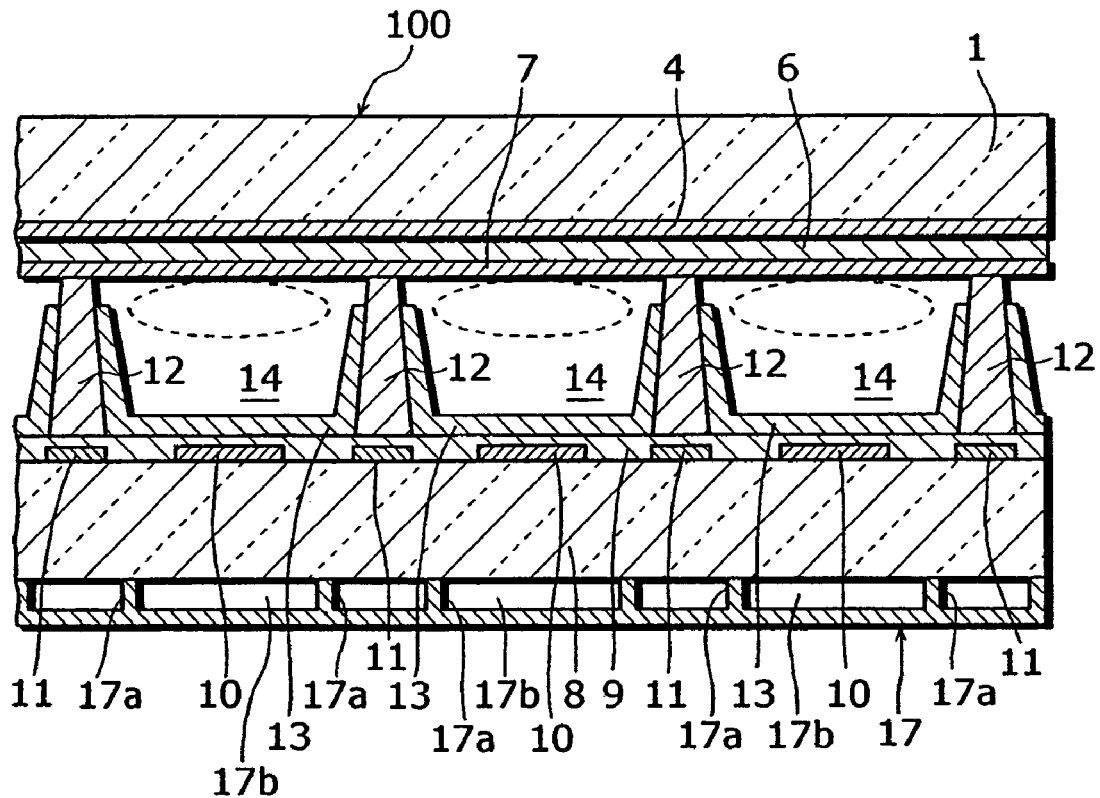
FIG. 2 is a cross-sectional diagram of the PDP along the line A-A shown in FIG. 1.
Figure 3:
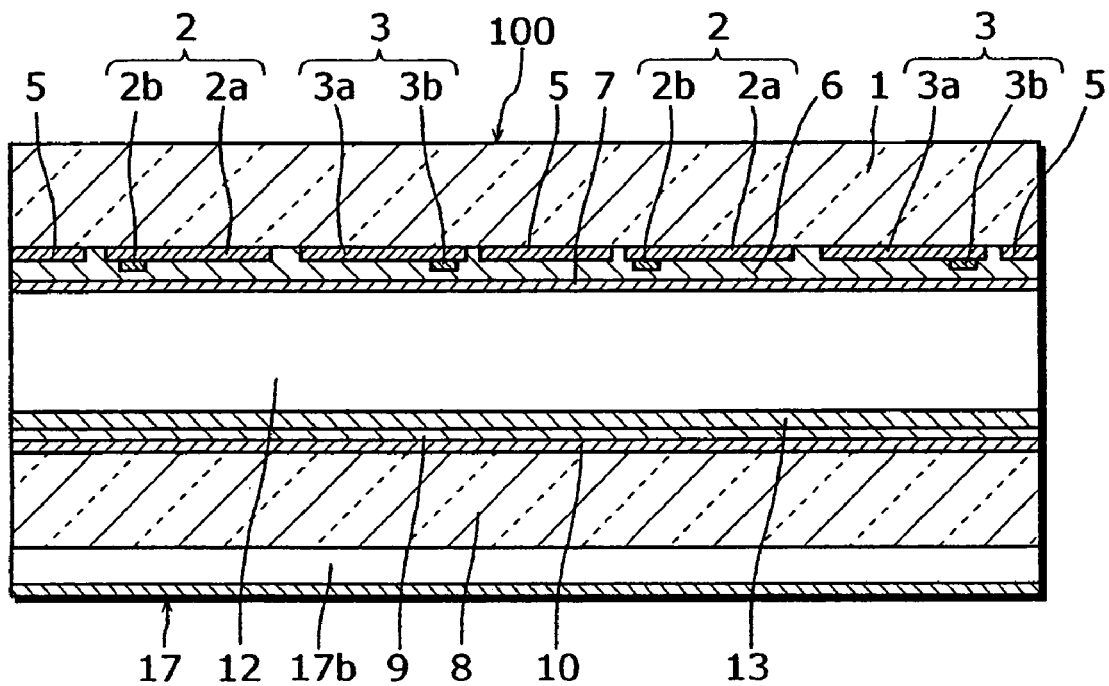
FIG. 3 is a cross-sectional diagram of the PDP along the line B-B shown in FIG. 1.

FIG. 1 is a cutaway perspective view showing a plasma display panel (PDP) 100 according to the first embodiment of the present invention, FIG. 2 is a cross-sectional diagram of the PDP 100 along the line A-A shown in FIG. 1, and FIG. 3 is a cross-sectional diagram of the PDP 100 along the line B-B shown in FIG. 1.

In FIGS. 1 to 3, a front glass substrate 1 is made of a heat-resistant glass for PDP such as soda glass substrate and high-distortion point glass substrate. On one of the surfaces of the front glass substrate 1 (the undersurface in FIG. 1/FIG. 3), a plurality of discharge electrodes 4, each being comprised of a pair of a scan electrode 2 and a sustain electrode 3 which are made of silver or Cr-Cu-Cr and which are placed in parallel and opposite each other. Between each two neighboring discharge electrodes 4, a light-shielding layer 5 is formed. Each scan electrode 2 and each sustain electrode 3 are respectively made of a transparent electrode 2a and a transparent electrode 3a, as well as of a bus electrode 2b and a bus electrode 3b such as silver that are electrically connected to the transparent electrodes 2a and 3a, respectively.

Furthermore, the above plurality of discharge electrodes 4 are covered with a dielectric layer 6 that is formed on one surface of the front glass substrate 1. Moreover, a protective film 7 made of MgO is formed on one surface of the dielectric layer 6. This protective film 7 also serves as a secondary electron emission film.

Meanwhile, a rear glass substrate 8, which is also made of a heat-resistant glass for PDP such as soda glass substrate and high-distortion point glass substrate as in the case of the front glass substrate 1, is placed in parallel and facing one surface of the front glass substrate 1. On the surface of this rear glass substrate 8 that faces the front glass substrate 1, address electrodes 10 are formed orthogonally to the discharge electrodes 4, each being comprised of a scan electrode 2 and a sustain electrode 3. Between each two neighboring address electrodes 10, a heating element 11 is placed in parallel with the address electrodes 10. Each heating element 11, which is made of a high-resistivity material such as stainless, nichrome, tungsten, and molybdenum, is formed in a linear form. When power is applied, each heating element 11 generates heat so as to restore the deteriorated display function. Detailed descriptions of heating elements 11 are given later.

The above-described address electrodes 10 and heating elements 11 are covered with a dielectric layer 9 that is on the rear glass substrate 8. On this dielectric layer 9, a plurality of striped barrier ribs 12 are formed above the respective heating elements 11 in parallel with such heating elements 11 and the address electrodes 10. A phosphor layer 13 is formed on the outer surface of each barrier rib 12 as well as on the surface of the dielectric layer 9. Each of the above dielectric layers 6 and 9 is an electrical insulating material that serves as a capacitor storing electric charge.

The front glass substrate 1 and rear glass substrate 8, which are placed facing each other with a predetermined gap between them, are sealed around them, as a result of which a small discharge space is created inside such sealed two substrates. Thus, the scan electrodes 2 and sustain electrodes 3, and the address electrodes 10 are placed orthogonally to each other across such small discharge space. This discharge space is filled, as discharge gas, with one of helium, neon, argon, and xenon, or a mixture of two or more of such gases. Furthermore, as FIG. 2 shows, the discharge space is divided by the barrier ribs 12 into a plurality of display spaces, and an intersection part of each discharge electrode 4 and address electrode 10 facing each other across each display space, forms a discharge cell 14. In each discharge cell 14, red, blue, and green phosphor layers 13 are successively deposited on a color-by-color basis. A gap between each of the discharge cells 14 is covered with a light-shielding layer 5, so that no discharges outside the discharge cells can be visible from outside.

A heat insulation material 17 is provided on a surface of the rear glass substrate 8 that is in the opposite direction to the front glass substrate 1. Inside this heat insulation material 17, as shown in FIG. 2, a plurality of beams 17a create a plurality of vacuum insulation spaces 17b. This heat insulation material 17 prevents heat generated by the heating elements 11 from emitting to outside from the surface of the rear glass substrate 8 that is in the opposite direction to the front glass substrate 1.

Figure 4:
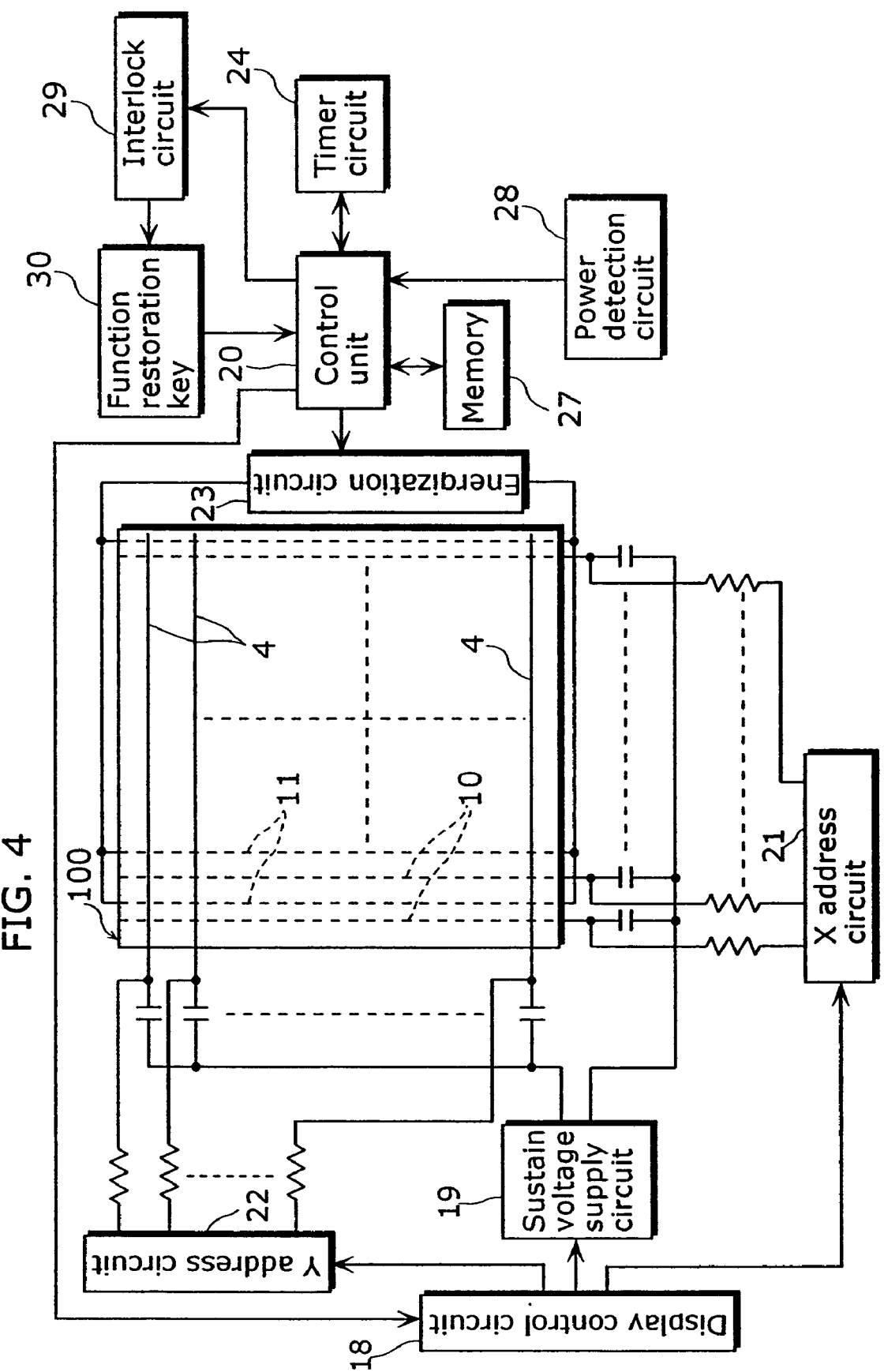
FIG. 4 is a block diagram showing an electric system of the PDP.

FIG. 4 is a block diagram showing the electric system of the PDP 100. A plurality of methods are available as a method for driving the PDP 100, but since the present invention is applicable to any of such methods, only a typical drive method is described in the present embodiment.

When the PDP 100 is driven, a display control circuit 18 supplies common sustain voltage to all the discharge cells 14 via a sustain voltage supply circuit 19. When the control unit 20 specifies, to the display control circuit 18, each discharge cell 14 to be driven, the display control circuit 18 selects, via an X address circuit 21 and a Y address circuit 22, an address electrode 10 and a discharge electrode 4 corresponding to each discharge cell 14 specified by the control unit 20 from among a plurality of discharge cells 14, and energizes such selected address electrode 10 and discharge electrode 4. Accordingly, in each selected discharge cell 14, a small writing discharge first occurs between the scan electrode 2 and the sustain electrode 3, as a result of which a wall charge is formed. Using this wall charge, a main discharge occurs between two neighboring discharge electrodes 4, and UV light that is generated by such main discharge is then emitted to the phosphor layers 13. Accordingly, a color image is displayed on the PDP 100.

When a total drive time of the PDP 100 reaches 2000 to 3000 hours, for example, its display function becomes slightly deteriorated in the form of wavelength shift and luminance degradation especially in the blue phosphors out of the phosphor layers 13 of each color. In view of this, the present embodiment is equipped with a function of restoring the deteriorated display function, when the above total drive time is reached, by presenting a screen display that prompts a user to carry out an operation for restoring the display function and then by energizing the heating elements 11 if such user has carried out the restoration operation as prompted by the screen display. Here, screen display is only an example, and therefore other means such as lamp and alarm may be used to notify the user that an operation for restoring the display function should be performed.

As the constituent elements for restoring the display function, the PDP 10 is equipped with: a heating element energization circuit 23 that energizes the heating elements 11 by supplying power to them in response to an instruction from the control unit 20; a timer circuit 24 that measures a total drive time; a memory 27 that stores the total drive time measured by the timer circuit 24; a power detection circuit 28 that detects whether or not the PDP 100 is powered on; a function restoration key 30 that gives an instruction, when it is operated, that processing for restoring the display function should be performed; and an interlock circuit 29 that locks the function restoration key 30 so that the function restoration key 30 cannot be operated, when the power detection circuit 28 detects that the PDP 100 is powered on.

Figure 5:
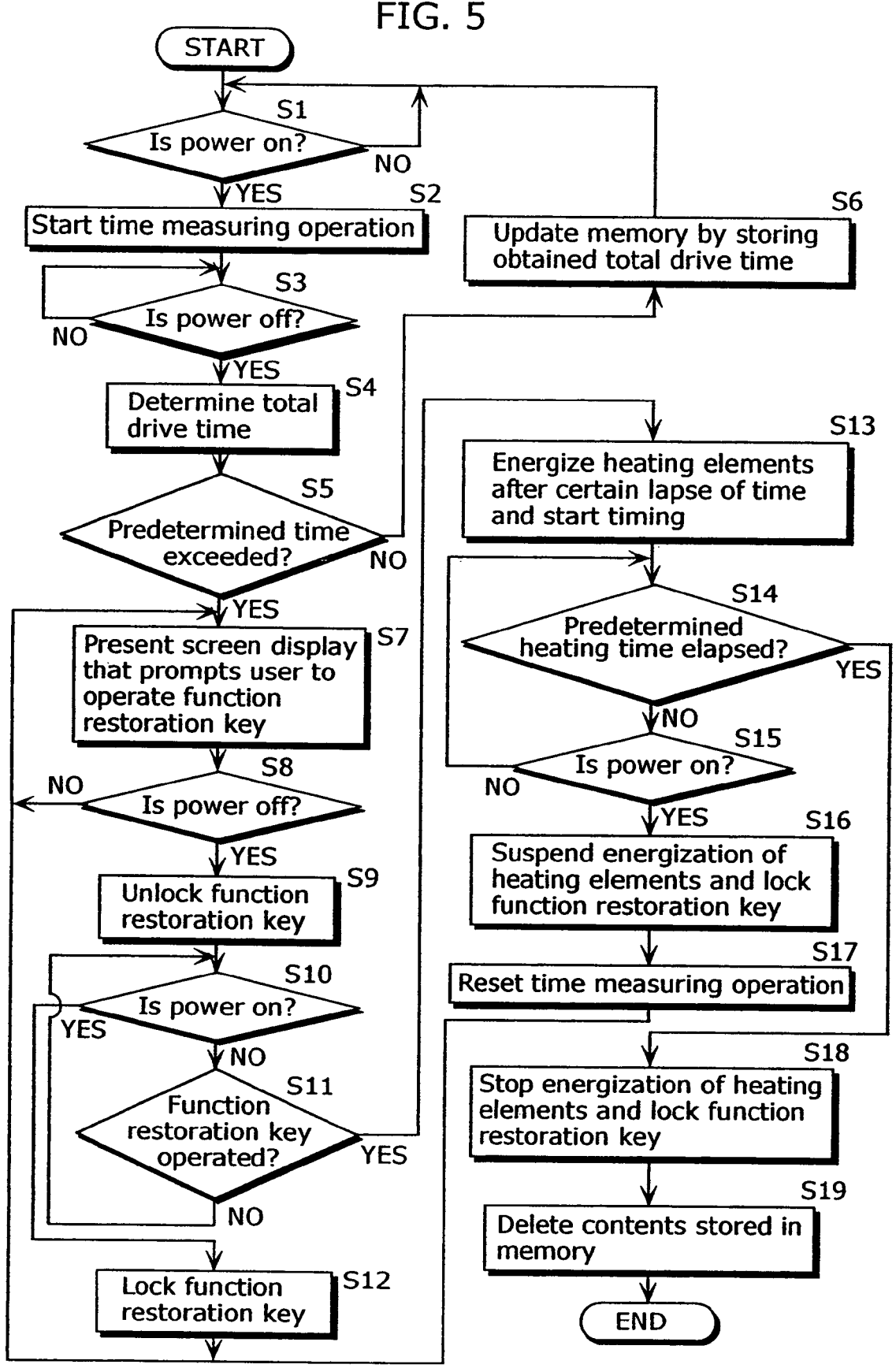
FIG. 5 is a flowchart showing control processing for restoring display function of the PDP.

Next, referring to a flowchart of FIG. 5, a description is given of control processing for restoring the display function. The control unit 20 continuously monitors whether the power of the PDP 100 is on or not, i.e., whether the PDP 100 is in the driven state or not, based on the presence/absence of a power-on signal inputted from the power detection circuit 28 (Step S1). Every time there is an input of power-on signal, the control unit 20 causes the timer circuit 24 to start a time measuring operation (Step S2). Then, the control unit 20 monitors if a power-on signal will stop being inputted as a result of terminating the drive of the PDP 100 (Step S3). When judging that the PDP 100 has been powered off and no power-on signal is inputted any more, the control unit 20 obtains a new total drive time by adding the total drive time read from the memory 27 to the drive time measured by the timer circuit 24 (Step S4), and judges whether such obtained total drive time exceeds a predetermined time or not (Step S5). Here, as the predetermined time, 2000 to 3000 hours is set after which processing for restoring the display function is required to be performed.

When judging that the predetermined time is not exceeded, the control unit 20 updates the memory 27 by storing a newly obtained total drive time (Step S6), after which the control unit 20 returns to Step S1 to repeat the above control processing. Meanwhile, when judging that the predetermined time is exceeded (Step S5), the control unit 20 directs the display control circuit 18 to present a screen display that prompts the user to operate the function restoration key 30 (Step S7). Accordingly, the display screen shows a message saying, for example, as follows: "Display function restoration processing is required now. Press function restoration key after turning off the power."

Then, the control unit 20 first monitors whether or not the user has powered off the PDP 100 as promoted by the screen display, on the basis of the presence/absence of a power-on signal from the power detection circuit 28 (Step S8), and when judging that the PDP 100 has been powered off, directs the interlock circuit 29 to unlock the function restoration key 30 (Step S9). Stated another way, the function restoration key 30 is usually locked by the interlock circuit 29 so that the key 30 cannot be operated. This aims at preventing the occurrence of inconveniences to be caused by the fact that function restoration processing is initiated by the user who has operated the function restoration key 30 by mistake although function restoration is not required.

Next, the control unit 20 judges whether the power has been turned on or not (Step 10), and when the PDP 100 is not powered on, the control unit 20 then judges whether the function restoration key 30 has been operated by the user or not (Step S11). Here, when the user performs an operation to power on the PDP 100 before operating the function restoration key 30, the control unit directs the interlock circuit 29 to lock the function restoration key 30 so that it cannot be operated (Step S12). This process aims at preventing the occurrence of inconveniences caused by the execution of function restoration processing while the PDP 100 is in the power on state. Possible inconveniences are described later. After this, the control unit 20 returns to Step S7, and repeatedly performs the control processes of Steps S7 to S12, after causing the display control circuit 18 to present a screen display that prompts the user to operate the function restoration key 30.

Meanwhile, when judging that the function restoration key 30 has been operated while the PDP 100 is in the power off state (Step S11), the control unit 20, after a certain lapse of time, directs the heating element energization circuit 23 to energize each of the heating elements 11 and causes the timer circuit 24 to start a time measuring operation (Step S13). Accordingly, the energized heating elements 11 generate heat, which is transferred to the phosphor layers 13 through the dielectric layer 9 and the barrier ribs 12. Accordingly, the phosphor layers 13 are heated. By heating the phosphor layers 13, it becomes possible to improve crystallinity that has been lowered after the exposure to UV light for a certain accumulated time, and therefore to restore its wavelength and luminance to the original state. A mechanism for restoring the wavelength and luminance of the phosphor layers 13 by heating them in the above manner is the same as a process of restoring crystallinity by means of annealing that is often used for other materials too.

Here, by heating the phosphor layers 13 at a temperature in the range of 400° C. to 800° C., preferably 500° C. to 600° C. as a predetermined heating temperature, it is possible to achieve a favorable effect of wavelength and luminance restoration. Therefore, the heating element energization circuit 23 energizes the heating elements 11 so that the phosphor layers 13 are heated at a temperature within the above range. However, there occurs a temperature gradient between the temperature of heat generated by the heating elements 11 and the temperature at which the phosphor layers 13 are heated because there exist the dielectric layer 9 and the barrier ribs 12 therebetween. Therefore, the temperature of heat generated by the heating elements 11 needs to be set in consideration of such temperature gradient. For example, when the heating temperature of the phosphor layers 13 is set to 500° C., the temperature of the heating elements 11 should be set to 600° C. In this case, since the heat insulation material 17 is provided on the other surface of the rear glass substrate 8, the temperature of the outer surface of the heat insulation material 17 is reduced to 100° C. or lower. Thus, there is no fear that the user burns his/her hands or that electric components attached near the PDP 100 are degraded because of the heat.

Furthermore, it is preferable to set the heating time of the phosphor layers 13 at the above heating temperature to be in the range between 10 and 120 minutes inclusive, and more preferably in the range between 20 and 60 minutes inclusive. This is because heating of less than 10 minutes is not sufficient to restore the wavelength and luminance of the phosphor layers 13, whereas heating of over 60 minutes needlessly consumes electric power. Note that "heating time" here refers to a length of time during which the temperature of the phosphor layers 13 remains at the above target heating temperature after the temperature of the phosphor layers 13 reaches such target heating temperature, rather than the time from when the heating of the phosphor 13 starts to when the temperature of the phosphor layers 13 returns to ordinary temperature. In Step S13, therefore, the heating elements 11 starts being energized after a certain lapse of time that is required by the respective constituent elements of the PDP 100 to go back to ordinary temperature after the power is turned off.

Moreover, after directing the heating element energization circuit 23 to energize the heating elements 11 (Step S13), the control unit 20 monitors whether the above predetermined heating time has elapsed or not on the basis of the time measured by the timer circuit 24 (Step S14), while continuously monitoring if the user will not perform an operation to turn on the power by mistake (Step S15). If the user turns the power on while function restoration processing of the phosphor layers 13 is carried out, the PDP 100 moves to driven state, making it impossible for the function restoration processing of the phosphor layers 13 to be performed correctly. For the same reason, the interlock circuit 29 locks the function restoration key 30 when the power is on so that the key 30 will not be operated.

Upon judging that the power of the PDP 100 has been turned on while the function restoration processing of the phosphor layers 13 is taking place (Step S15), the control unit 20 directs the heating element energization circuit 23 to suspend the energization of the heating elements 11 and directs the interlock circuit 29 to lock the function restoration key 30 so that it will not be operated (Step S16). Furthermore, after resetting the time measuring operation of the timer circuit 24 (Step S17), the control unit 20 returns to Step S7 to repeatedly perform the control processes of the above Steps S7 to S15.

Meanwhile, when judging that a predetermined heating time has elapsed after the start of the function restoration processing of the phosphor layers 13 (Step S14), the control unit 20 directs the heating element energization circuit 23 to stop energizing the heating elements 11 and directs the interlock circuit 29 to lock the function restoration key 30 so that it will not be operated (Step S18), as well as deleting the contents stored in the memory 27 (Step S19) to complete the function restoration processing of the phosphor layers 13.

Note that in the present embodiment, an example case has been illustrated where the heating elements 11 are provided for the respective phosphor layers 13 of red, blue, and green colors, but it is also possible to achieve an effect equivalent to the above described effect if heating elements 11 are provided only near the blue phosphor layers 13. This is because wavelength shift and luminance degradation are especially notable in blue phosphor layers 13, while wavelength shift and luminance degradation of red and green phosphor layers 13 are small.

Figure 6A:
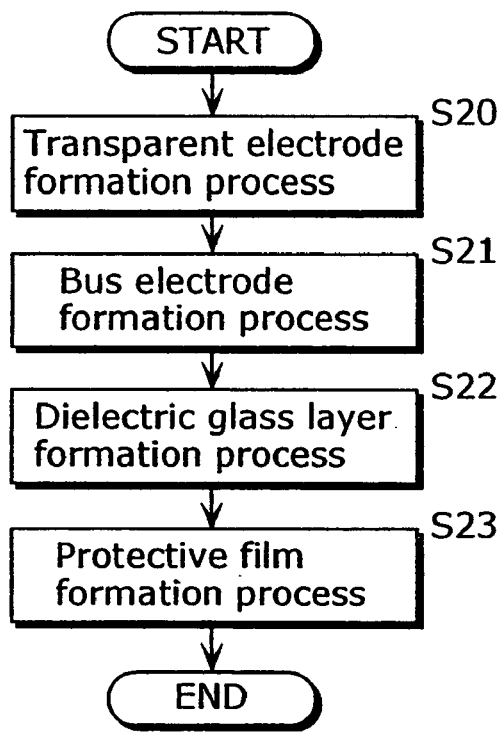
FIG. 6A is a flowchart showing a process of fabricating a front structure.
Figure 6B:
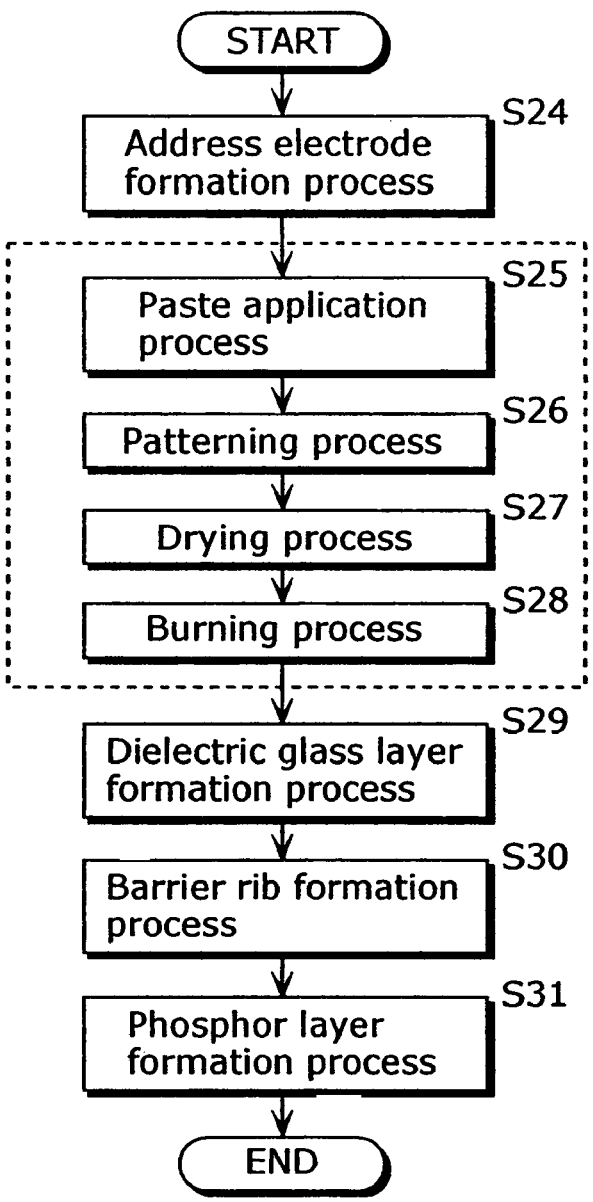
FIG. 6B is a flowchart showing a process of fabricating a rear structure.
Figure 6C:
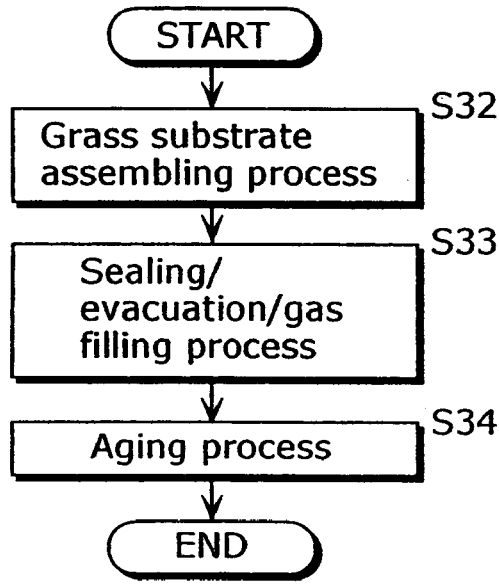
FIG. 6C is a flowchart showing a process of assembling the front structure and the rear structure.

Next, referring to FIGS. 6A, 6B, and 6C, a description is given of a method for fabricating the PDP 100 according to the present embodiment. First, referring to FIG. 6A, a description is given of processing of fabricating a front structure. After forming an Indium Tin Oxide (ITO) film on the cleansed front glass substrate 1 by a sputtering method, transparent electrodes 2a and 3a are formed by removing unnecessary parts using a known photo-etching method (Step 20). Then, bus electrodes 2b and 3b are formed on these transparent electrodes 2a and 3b by means of a printing method that uses screen or by a photo-etching method, for example (Step S21).

Next, after forming a light-shielding layer 5 between each of the discharge electrodes 4 formed on the front glass substrate 1, each discharge electrode 4 being comprised of transparent electrodes 2a and 3a and bus electrodes 2b and 3b, paste made from glass powder is applied all over the front glass substrate 1 by means of printing, for example. Then, the front glass substrate 1 is heated at around 600° C. to allow the glass powder layer to melt, as a result of which a transparent dielectric layer 6 is formed (Step S22). Finally, a protective film 7 made of magnesium oxide is formed on the dielectric layer 6 by a vacuum evaporation method (Step S23), and the fabrication of the front structure is completed.

Next, referring to FIG. 6B, a description is given of processing of fabricating the rear structure. First, address electrodes 10 are formed on the cleansed rear glass substrate 8 into a predetermined pattern by using a thick-film printing method utilizing silver paste (Step S24). Subsequently, processes of fabricating heating elements 11 of Steps S25 to S28 are performed. More specifically, using a dispenser or the like, paste, which is obtained by mixing glass powder with a powdery high-resistivity material (e.g. stainless, nichrome, tungsten, molybdenum) and then by mixing the resulting powder with a solvent, is applied between each of the address electrodes 10 on the rear glass substrate 8 (Step S25). After this, such applied paste is patterned into lines, each with a width of 50 μm to 100 μm (Step S26), dried (Step S27), and then burnt (Step S28). Accordingly, the glass components included in the paste melt to serve as glue with which glasses are coupled onto the rear glass substrate 8, and the high-resistivity material is fixed onto the outer surface of the rear glass substrate 8, allowing a predetermined pattern of heating elements 11 to be formed.

Next, after applying, by means of printing or the like, paste made from glass powder all over the rear glass substrate 8 on which the address electrodes 10 and heating elements 11 have been formed, the rear glass substrate 8 is heated at around 600° C. to allow the glass power layer to melt and a transparent dielectric layer 9 to be formed (Step S29). Then, by performing overlay printing by repeating thick-film printing that uses low melting glasses and drying, glass powder ribs are formed, which are then burnt to form barrier ribs 12 (Step S30). Furthermore, on the dielectric layer 9 and the barrier ribs 12, phosphor layers 13 that are colored into red, green, and blue are formed in the respective discharge cells 14 by means of thick-film printing (Step S31). Finally, a sealing layer serving as a vacuum sealer is formed around the rear glass substrate 8 by a printing method, and the fabrication of the rear structure is completed.

Next, referring to FIG. 6C, a description is given of processing of assembling the front structure and the rear structure. The front structure as the front glass substrate 1 and the rear structure as the rear glass substrate 8 fabricated through the above-described processes are assembled at mutually opposing positions and tentatively fixed in such position (Step S32).

Then, a sealing/evacuation/gas filling process (Step S33) is performed. In this process, a chip tube for taking discharge gas to inside is formed on an air exist of the rear glass substrate 8, and then the two substrates are burnt in a calcining furnace for sealing. Accordingly, the seal glass in the low-melting sealing layer formed in the final process of fabricating the rear structure and the seal glass of the chip tube melt and weld the two glass substrates 1 and 8 and the exhaust tube together. As a result, one panel is formed. As gas filling, the exhaust tube gets connected to a vacuum device so as to exhaust the gas inside the panel in a high-temperature atmosphere that is set at around 400° C. in the high-temperature calcining furnace. Then, by filling the panel with discharge gas (e.g. a mixture of neon and xenon), the fabrication of a required PDP 100 completes. Finally, an aging process is performed in which voltage that is higher than the breakdown voltage is applied to all the discharge electrodes 4 of the completed panel 100 to perform long-time discharge (Step S34). This process aims at further stabilizing discharge characteristics.

This fabrication method is realized by adding the processes of fabricating heating elements 11 (Steps S25 to S28) to the existing processes, and thus such processes of fabricating the heating elements 11 may be performed prior to the process of fabricating address electrodes 10 (Step S24). In other words, since heating elements 11 can be successively formed in the same fabrication process as that of address electrodes 10, it is possible to form heating elements 11 through simple fabrication processes. As a result, the present method does not require high fabrication cost compared with the existing fabrication methods.

Figure 7A:
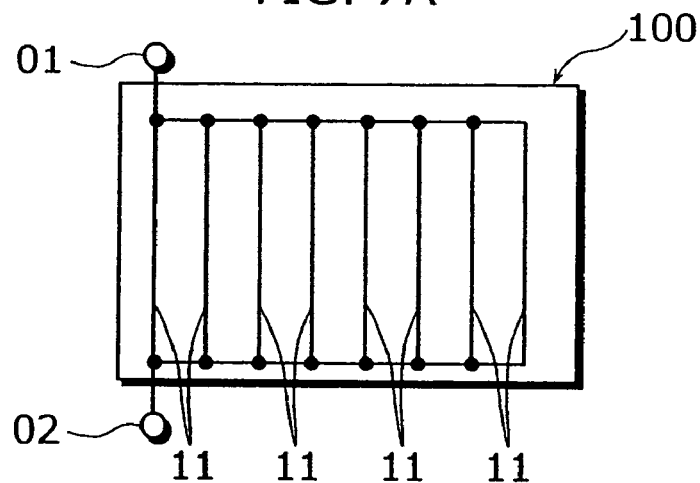
FIGS. 7A, 7B, and 7C are diagrams, each showing a different pattern of forming heating elements on the PDP.
Figure 7B:
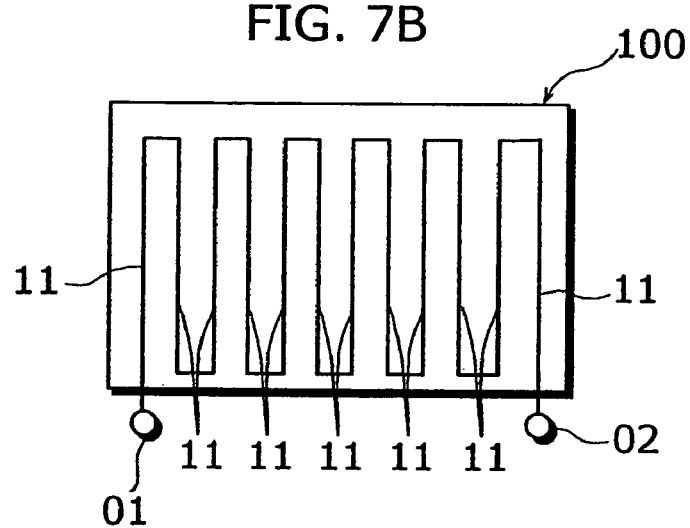
Figure 7C:
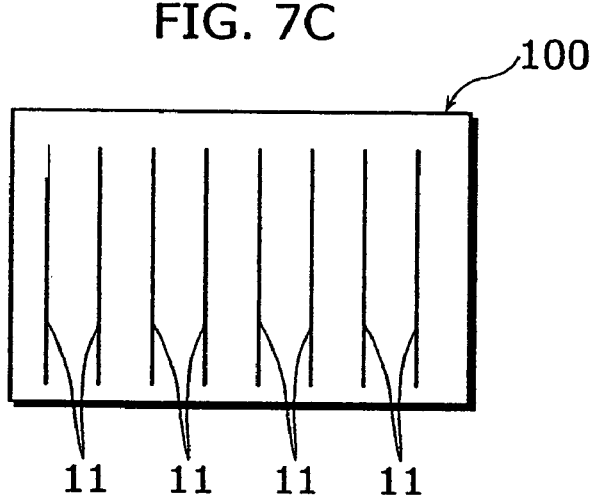

FIGS. 7A, 7B, and 7C are diagrams showing preferable forming patterns of heating elements 11. FIG. 7A shows that heating elements 11 are formed like a ladder by arranging linear heating elements 11 in parallel with each other and commonly connecting the both ends of each heating element 11 to lead them to joining terminals O1 and O2. FIG. 7B shows that heating elements 11 are formed in a zigzag pattern by arranging linear heating elements 11 in parallel with each other, serially connecting the heating elements 11, and leading the both ends of such serial connection to joining terminals 01 and 02, respectively. The heating elements 11 that are formed according to the patterns shown in FIGS. 7A and 7B can be supplied with power from the heating element energization circuit 23 shown in FIG. 4 to be energized. FIG. 7C shows that heating elements 11 are formed independently of each other by simply arranging them in parallel with each other without leading them to joining terminals O1 and O2. Each of these heating elements 11 is one to which radio frequencies and microwaves are radiated from outside, by providing a high-frequency field generation unit or the like instead of the heating element energization circuit 23 shown in FIG. 4, in order to make the heating elements 11 generate heat by themselves by means of induction heating. Note that it is preferable that top seven and bottom seven connection points illustrated in FIG. 7A serve as low-voltage resistors that prevent voltage effects in a lateral direction in the drawing.

Figure 8:
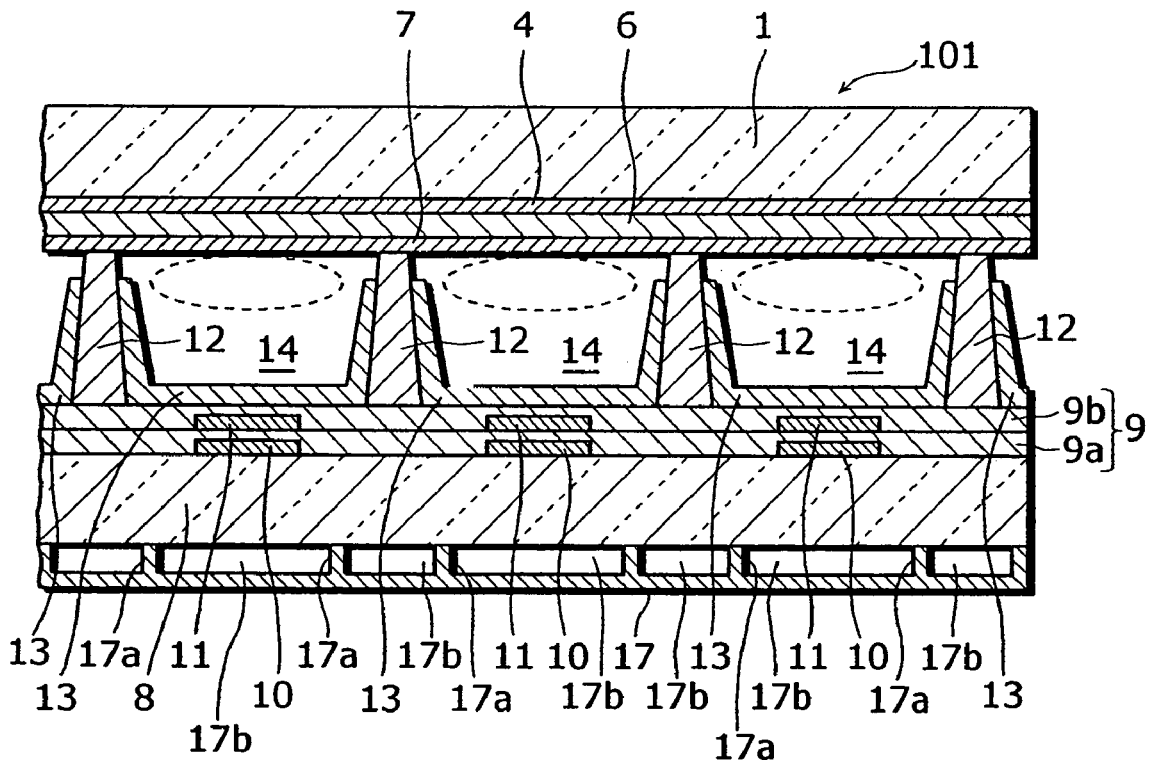
FIG. 8 is a cross-sectional diagram showing a PDP according to a second embodiment of the present invention.

FIG. 8 is a cross-sectional diagram showing a plasma display panel 101 according to the second embodiment of the present invention. This cross-sectional diagram shows the PDP 101 that is cut at a position corresponding to the A-A line shown in FIG. 1. In this drawing, consistent elements that are the same as or equivalent to those shown in FIG. 2 are assigned the same reference numbers, and descriptions thereof are omitted. While heating elements 11 are provided between each two neighboring address electrodes 10 in the first embodiment, heating elements 11 of the PDP 101 of the present embodiment are embedded in the dielectric layer 9, facing the respective address electrodes 10 across the dielectric layer. The other constituent elements are the same as those presented in the first embodiment.

As is obvious from a comparison between FIG. 2 and FIG. 8, since the heating elements 11 in the PDP 101 are placed closer to the phosphor layers 13 than those of the PDP 100 of the first embodiment, it is possible to transfer the heat generated by the heating elements 11 efficiently to the phosphor layers 13, which are then heated efficiently as a result. This makes it possible to achieve the effect that the phosphor layers 13 are heated at a predetermined temperature, while setting the heat temperature of the heating elements 11 to lower compared with the first embodiment. Note that the heating elements 11 are energized by the control unit 20 executing the control processing based on the flowchart shown in FIG. 5.

Figure 9:
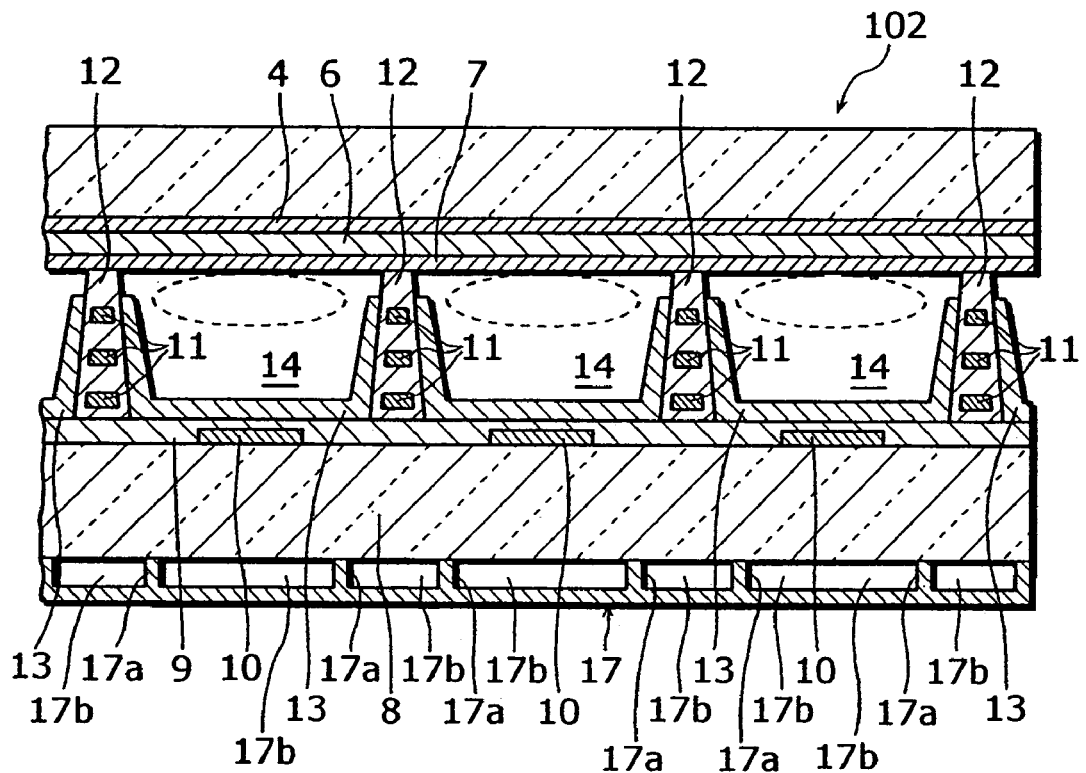
FIG. 9 is a cross-sectional diagram showing a PDP according to a third embodiment of the present invention.

FIG. 9 is a cross-sectional diagram showing a plasma display panel 102 according to the third embodiment of the present invention. This cross-sectional diagram shows the PDP 102 that is cut at a position corresponding to the A-A line shown in FIG. 1. In this drawing, consistent elements that are the same as or equivalent to those shown in FIG. 2 are assigned the same reference numbers, and descriptions thereof are omitted. While heating elements 11 are provided between each of the address electrodes 10 in the first embodiment, plural steps (three steps in the present embodiment) of heating elements 11, which are placed with a gap between each of them and which are embedded in the barrier ribs 12, are in the PDP 102 of the present embodiment. The other construction is the same as that of the first embodiment.

In this PDP 102, since plural steps of heating elements 11 are placed closer to the phosphor layers 13 than those of the PDPs 100 and 101 of the first and second embodiments, it is possible to transfer the heat generated by the heating elements 11 in an extremely efficient manner and therefore to heat the phosphor layers 13 efficiently. This makes it possible to achieve the effect that the phosphor layers 13 are heated at a predetermined temperature, while setting the heat temperature of the heating elements 11 to further lower than in the case of the second embodiment. Here, the heating elements 11 are energized by the control unit 20 executing the control processing on the basis of the flowchart shown in FIG. 5. Note that a part or the whole of the respective barrier ribs 12 may be made of high-resistivity material so that power is applied to each portion made of high-resistivity material, rather than embedding the heating elements 11 in the barrier ribs 12. With this construction, the barrier ribs 12 serve also as heating elements. In this case, it is possible to heat the phosphor layers 13 in a more efficient manner.

Figure 10:
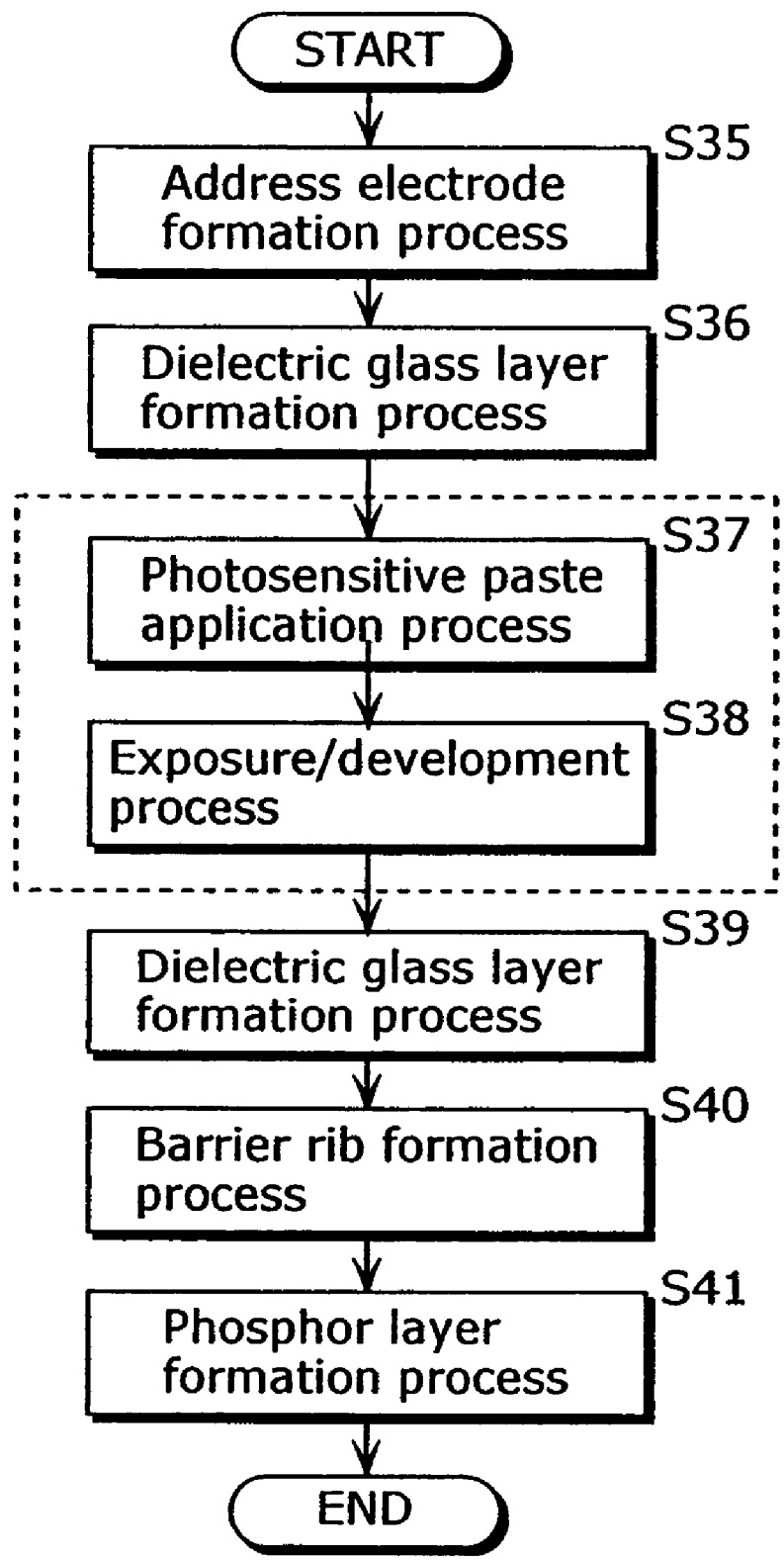
FIG. 10 is a flowchart showing processing of fabricating the rear structure of the PDP according to the second embodiment.

FIG. 10 is a flowchart showing processing of fabricating the rear structure of the PDP 101 illustrated in FIG. 8 according to the second embodiment. First, address electrodes 10 are formed on the cleansed rear glass substrate 8 into a predetermined pattern by using a thick-film printing method that utilizes silver paste (Step S35). Subsequently, by means of printing or the like, paste made from glass powder is applied all over the rear glass substrate 8 on which the address electrodes 10 have been formed. Then, the front glass substrate 8 is heated at around 600° C. to allow the glass powder layer to melt, as a result of which a transparent rear dielectric layer 9a that is thick enough to cover the address electrodes 10 is formed (Step S36).

Next, photosensitive paste including a high-resistivity material is formed to be applied over an upper surface of each address electrode 10 on the rear dielectric layer 9a (Step S37). Then, by forming such applied photosensitive paste into a predetermined pattern through exposure and development processes (Step S38), heating elements 11 are formed. Then, a transparent front dielectric layer 9b is formed through a process equivalent to Step S36 described above in a manner that the first and second dielectric layer 9a and 9b can form a dielectric layer 9 having a predetermined thickness as a whole (Step S39).

Then, by performing overlay printing by repeating thick-film printing that uses low melting glasses and drying, glass power ribs are formed, which are then burnt to form barrier ribs 12 (Step S40). Furthermore, on the dielectric layer 9 and the barrier ribs 12, phosphor layers 13 that are colored into red, green, and blue are formed in the respective discharge cells 14 by means of thick-film printing (Step S41). Finally, a sealing layer serving as a vacuum sealer is formed around the rear glass substrate 8 by a printing method, and the processing of fabricating the rear structure is completed. Note that the processing of fabricating the front structure and the processing of assembling the front structure and the rear structure are the same as those shown in FIGS. 6A and 6C.

While the present fabrication method involves two processes for forming the dielectric layer 9 compared with the processing shown in FIG. 6 of the first embodiment, there is an advantage that the heating elements 11 can be placed closer to the phosphor layers 13 than in the case of the PDP 100 of the first embodiment. Note that the heating elements 11 may be formed through each of the processes of Steps S25 to S28 shown in FIG. 6B of the first embodiment, rather than through each of the processes of Steps S37 and S38 shown in FIG. 10. Furthermore, the heating elements 11 may also be formed through the known fabrication processes that are the same as those for fabricating rear glasses of automobiles.

Moreover, while no diagrammatic illustration is given for processing of fabricating the rear structure of the PDP 102 shown in FIG. 9 according to the third embodiment, it is possible to form, through the following procedure, a construction in which plural steps of heating elements 11 with a gap between them are embedded in the barrier ribs 12: forming address electrodes 10 and a dielectric layer 9 on the rear glass substrate 8 through processes equivalent to Steps S24 and S29 shown in FIG. 6B; and then repeatedly and alternately performing the process of Step S30 shown in FIG. 6B for forming the barrier ribs 12 and the processes of Steps S25 to S28 shown in FIG. 6B or the processes of Steps S37 and S38 for forming the heating elements 11.

Figure 11:
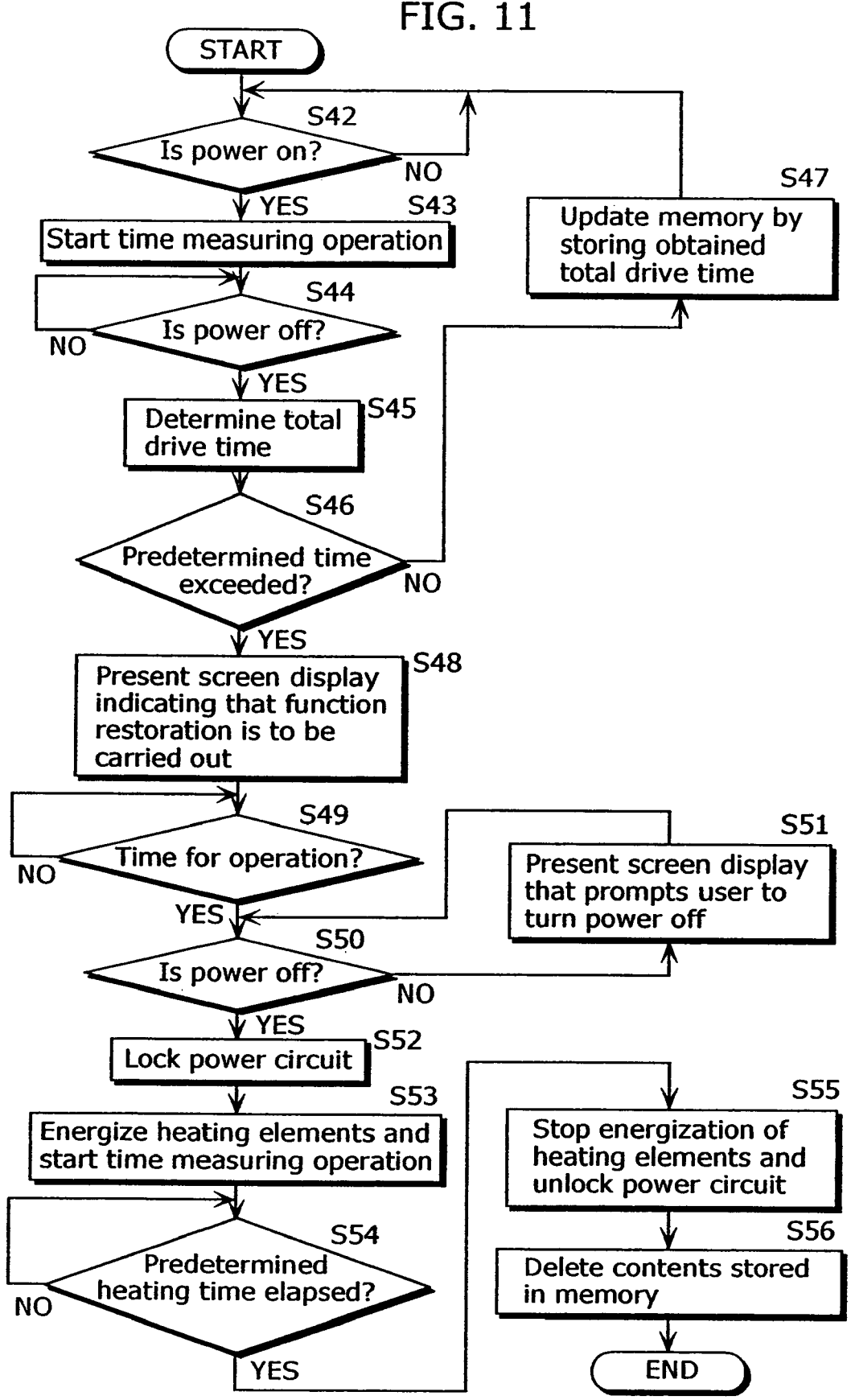
FIG. 11 is a flowchart showing another control processing for function restoration according to each of the aforementioned embodiments.

In the first or third embodiment, by the control unit 20 shown in FIG. 1 executing the control processing based on the flowchart of FIG. 5, a screen display is presented to prompt the user to perform the function restoration operation and the user then initiates processing of function restoration by manually operating the function restoration key 30 based on such display screen. In addition to this construction, the control unit 20 may also perform function restoration processing automatically upon judging that the PDP is in need of function restoration. FIG. 11 is a flowchart showing control processing performed by the control unit 20 when it automatically performs function restoration processing. The following describes such control processing shown in FIG. 11. Note that reference numbers of the constituent elements shown in FIG. 4 are referred to when explaining FIG. 11. However, in the control processing shown in FIG. 11, the function restoration key shown in FIG. 4 is not required, and the interlock circuit 29 locks the power key instead so that it will not be operated. Furthermore, a clock circuit is additionally required for this control processing.

The control unit 20 continuously monitors whether the power of the PDP is on or not based on the presence/absence of a power-on signal inputted from the power detection circuit 28 (Step S42). Every time there is an input of power-on signal from the power detection circuit 28, the control unit 20 causes the timer circuit 24 to start its operation (Step S43). Then, the control unit 20 monitors if a power-on signal will stop being inputted from the power detection circuit 28 as a result of terminating the drive of the PDP (Step S44). When judging that the PDP is powered off and no power-on signal is inputted any more, the control unit 20 obtains a new total drive time by adding the total drive time read from the memory 27 to the drive time measured by the timer circuit 24 (Step S45), and judges whether such obtained total drive time exceeds a predetermined time or not (Step S46). Here, as the predetermined time, 2000 to 3000 hours is set after which processing for restoring the display function is required to be performed.

When judging that the predetermined time is not exceeded, the control unit 20 updates the memory 27 by storing a newly obtained total drive time (Step S47), after which the control unit 20 returns to Step S42 and repeats the above control processing. Meanwhile, when judging tht the predetermined time is exceeded (Step S46), the control unit 20 directs the display control circuit 18 to present a screen display indicating that function restoration processing is to be performed (Step S48). Accordingly, the display screen shows a message saying, for example, as follows: "Display function restoration processing starts after the power is turned off. Note that you cannot turn on the power until five next morning".

Then, the control unit 20 monitors if a predetermined processing start time is reached, with reference to a time signal from the clock circuit (Step S49). Here, the processing start time is set in advance within the time period during which the user has the least possibility to turn the power on (e.g. from two to four in the morning) or in the time period during which the PDP is not used, the time period being detected by the control unit 20 from a certain length of time starting from when the PDP use starts.

When judging that the processing start time is reached (Step S49), the control unit 20 judges whether the power is turned off or not based on the presence/absence of a power-on signal from the power detection circuit 28 (Step S50). If the power is turned on, the control unit 20 causes the display control circuit 18 to present a screen display that prompts the user to turn the power off, such as "When the power gets turned off, display function restoration processing is initiated" (Step S51) and then waits for the user to turn the power off.

When judging that the power has been turned off, the control unit 20 directs the interlock circuit 29 to lock the power key so that it cannot be turned on (Step S52), as well as directing the heating element energization circuit 23 to energize each of the heating elements 11 and causes the timer circuit 24 to start time measuring operation (Step S53). Accordingly, the energized heating elements 11 generate heat, which is transferred to the phosphor layers 13 to heat them. Then, the control unit 20 monitors whether a predetermined heating time has elapsed or not on the basis of the time measured by the timer circuit 24 (Step S54). Here, a heating temperature and a heating time of the heating elements 11 are set equivalently to those of the first embodiment.

When judging that a predetermined heating time has elapsed since the function restoration processing of the phosphor layers 13 started, the control unit 20 directs the heating element energization circuit 23 to stop energizing the heating elements 11 as well as directing the interlock circuit 29 to unlock the power key (Step S55), and deletes the contents stored in the memory 27 (Step S56) to complete the function restoration processing of the phosphor layers 13. Accordingly, the crystallinity of the phosphor layers 13 is improved and their wavelength and luminance are restored to the original state.

The first and third embodiments have a configuration in which the heating elements 11 are provided, and display function restoration processing is performed by energizing the heating elements 11 when a total drive time reaches a predetermined time so as to heat the phosphor layers 13. However, it is also possible to cause a conventional PDP to perform display function restoration processing if such conventional PDP does not have a mechanism for restoring display function. Next, referring to a flowchart shown in FIG. 12, a description is given of a first method for restoring the function of a PDP according to the present invention.

Figure 12:
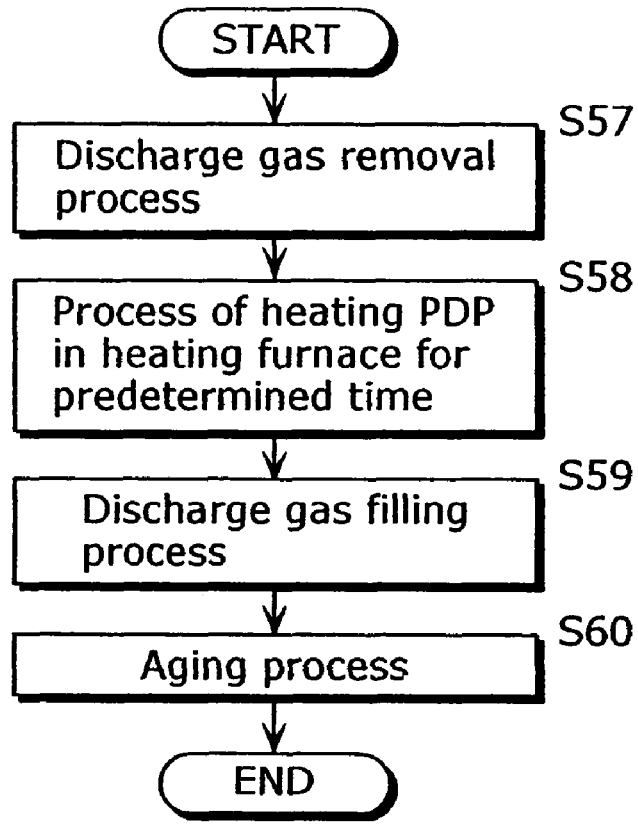
FIG. 12 is a flowchart showing a first method for restoring the function of a PDP according to the present invention.

Before explaining FIG. 12, a description is given of a PDP. In addition to the conventional constituent elements, the PDP is equipped with the power detection circuit 28, the timer circuit 24, the memory 27, and the control unit 20 that are shown in FIG. 4. As in the case of the first or third embodiment, the control unit 20 (i) causes the timer circuit 24 to time a length of time during which a power-on signal is inputted from the power detection circuit 28, (i) performs a calculation for adding the length of time measured by the timer circuit 24 so as to obtain a total drive time, (iii) causes the memory 27 to store a total drive time every time a total drive time is updated, and (iv) continuously monitors whether the total drive time has reached a predetermined time or not. Furthermore, upon judging that the above predetermined time has been reached, the control unit 20 gives a direction that a screen display should be presented to prompt the user to request the manufacturer of the PDP to perform function restoration processing. For example, the screen display says as follows: "Display function restoration processing is required now. Contact the store where you purchased it".

The manufacturer, after receiving a notification from the user who has contacted it as prompted by the above screen display, collects the PDP and removes the discharge gas (e.g. a mixture of neon and xenon) from such collected PDP (Step S57). Then, the manufacturer puts the PDP into the heating furnace to heat it at a predetermined heating temperature for a predetermined period of time, while exhausting air from the internal spaces from which the discharge gas has been removed (Step S58). The heating temperature and heating time are as described in the first or third embodiment. Through this heating processing, the crystallinity of the phosphor layers 13 that has become lowered after the exposure to UV radiation for a certain accumulated time is improved and their wavelength and luminance are restored to the original state. After this heating processing for restoring display function, the manufacturer fills the PDP with discharge gas to return it to the original state (Step S59). Finally, the manufacturer performs an aging process in which voltage that is higher than the breakdown voltage is applied to all the discharge electrodes 4 of the completed panel to perform long-time discharge (Step S60).

This method for restoring the function of a PDP is capable of draining, to outside, impurities that are generated inside the internal spaces at the time of heating, since discharge gas is removed from the PDP prior to heating, and air is exhausted, while the PDP is heated, from the internal spaces from which discharge gas has been drained. Accordingly, since it is possible to prevent the occurrence of adverse effects caused by the fact that the impurities vaporized by heating react with the phosphor layers 13, it becomes possible to restore the display function in a further efficient manner. What is more, since the PDP is heated in a heating furnace according to the present restoration method, no temperature gradient occurs across the area from the vicinity of the heating elements to the phosphor layers 13, in the case where the heating elements 11 are provided as described above. Accordingly, it is possible to heat the phosphor layers 13 correctly at a heating temperature that is set to the heating furnace and therefore to perform a desirable function restoration processing. Note that the same function restoration effect can be achieved if the collected PDP is inserted directly into the heating furnace for heating, without performing the above gas exchange.

Figure 13:
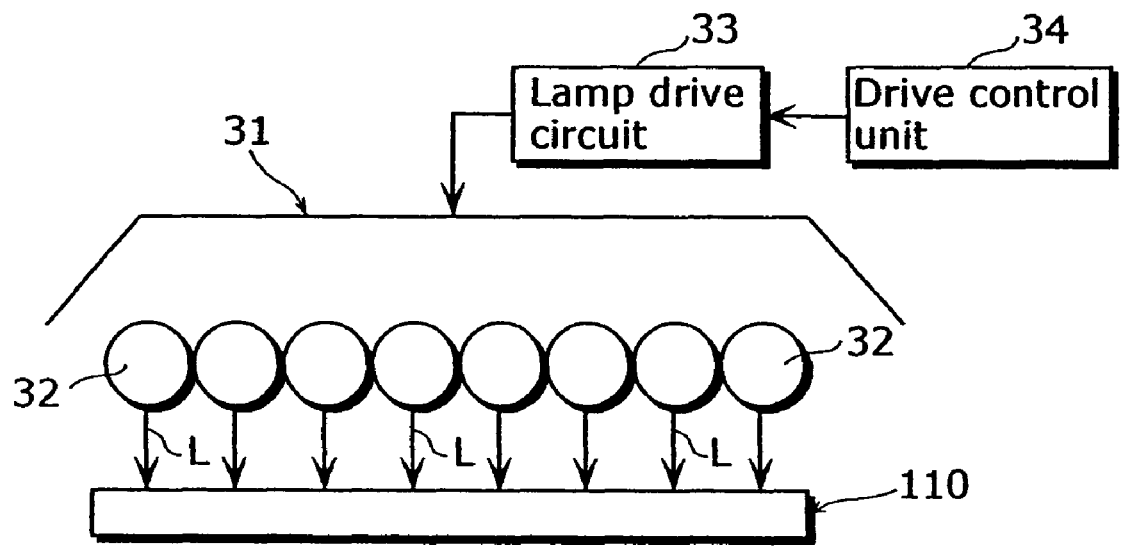
FIG. 13 is a schematic diagram showing a second method for restoring the function of a PDP according to the present invention.

FIG. 13 is a schematic diagram showing a second method for restoring the function of a PDP according to the present invention. As in the case of the PDP presented for the explanation of the first restoration method shown in FIG. 12, a PDP 110 according to this embodiment is equipped with the power detection circuit 28, the timer circuit 24, the memory 27, and the control unit 20 shown in FIG. 4, without including any heating elements and energization units. In other words, in the present restoration method, as in the case of the first restoration method shown in FIG. 12, the manufacturer collects the PDP 110 when receiving a notification from the user who has contacted it as prompted by the above screen display, but it restores the function of the phosphor layers by heating them by use of a photoirradiation unit, rather than through heating processing utilizing the heating units as in the case of the first restoration method.

Referring to FIG. 13, the present embodiment uses, as a photoirradiation unit, a photoirradiation apparatus 31 that is comprised of a plurality of xenon flash lamps 32 that are placed in parallel with each other. By flashing each of such xenon flash lamps 32 in synchronization with a lamp drive circuit 33, lights L are irradiated to the PDP 110. Then, by irradiating such lights L to the outer surface of the phosphor layers 13 via the glass substrate 1, dielectric layer 6, and protective film 7 shown in FIG. 1, the surface of the phosphor layers 13 are heated at 400° C. to 800° C.

In the present embodiment, an example case is presented in which the lights L are directly irradiated to the PDP 110 without disassembling it. In this case, in order to heat the phosphor layers 13 at the above-described temperature, a condition needs to be set as follows: as a xenon flash lamp 32, a lamp that emits a light L with wavelengths in the range between 200 nm and 4.5 μm inclusive should be selected. This is because the use of a light L with a wavelength of 4.5 μm or less makes it possible for the light L to reliably reach the phosphor layers 13 via the glass substrate 1, dielectric layer 6, and protective film 7, whereas the reason for using a light L with a wavelength of 200 nm or more is because a light L with a wavelength of 200 nm or less might destroy the phosphor crystallinity of the phosphor layers 13. Note that it is more preferable to use an infrared radiation with a wavelength of 800 nm or more since it is conceivable that a visible light's high reflectivity and transmittance from and to the phosphor layers 13 hinders the heating from being performed in an efficient manner.

Meanwhile, the drive control unit 34 controls the power supply from the lamp drive circuit 33 to the xenon flash lamps 32 so that each of the xenon flash lamps 32 emits a light L with energy densities in the range between 100 J/cm$^2$ and 5000 J/cm$^2$ inclusive. This is because the energy density of 100 J/cm$^2$ or less is not enough for heating, whereas the energy density of 5000 J/cm$^2$ or more is too high since luminance restoration of the phosphor layers 13 becomes saturated, resulting in a waste of energy.

Furthermore, the drive control unit 34 controls a length of time for which the photoirradiation apparatus 31 comprised of a plurality of xenon flash lights 32 remains driven to irradiate lights L, to an extremely short time such as in the range between 1 nsec and 10 msec inclusive. This is because it is technically difficult to drive each xenon flash lamp 32 to make it flash for an extremely short time of 1 nsec or less and it is costly even if it is possible. Meanwhile, if each xenon flash lamp 32 is driven for 10 msec or more, heat is transferred further than the outer surface of the phosphor layers 13, and restoration processing is performed also for phosphor particles that are not suffering from serious degradation, resulting in a waste of processing energy and processing time. Furthermore, there also occurs the possibility that constituent elements of the PDP 110 become cracked by thermal shock because thermal expansion coefficients are different on an element-by-element basis, and that defects such as the coming off of films and quality degradation occur due to the fact that the constituent elements other than the phosphor layers 13 are adversely affected because thermal expansion coefficients are different for each constituent element.

Note that in the case where the collected PDP 110 is disassembled and lights L are directly irradiated to the phosphor layers 13, there is no need to set the above conditions concerning the wavelength and energy density of each light L and concerning a length of time during which lights L should be irradiated. In this case, however, processes of disassembling and reassembling the PDP 110 are required.

In such case where the lights L are directly irradiated to the phosphor layers 13, there is an advantage that only a least possible processing energy as well as a shorter processing time is required since only the outermost surface of each phosphor layer 13 suffering from the most serious degradation is heated. Furthermore, since a processing time is extremely short, there is no thermal shock on the PDP 110, which causes no possibility that the constituent elements other than the phosphor layers 13 become subject to the coming off of films and quality degradation.

Note that phosphor particles, which can be restored by the irradiation of lights L, emit lights according to the following mechanism: their parent body or parent crystal such as BAM absorb energy from outside; the absorbed energy is then transferred to luminescent ions; the ions in the ground state move to the excited state; the excited ions reach the luminescence level that is a more stable excited state, while losing energy due to thermal/lattice vibration; and the excited ions return to the ground state, emitting lights.

Figure 14:
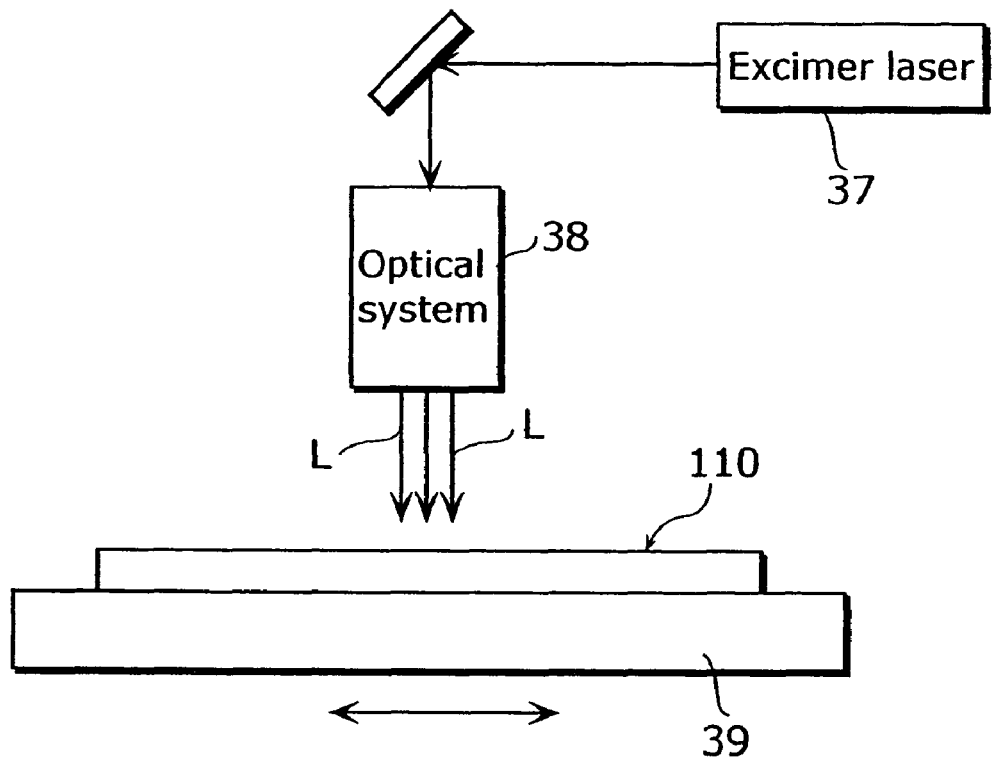
FIG. 14 is a schematic diagram showing a variation of the second method for restoring the function of a PDP.

FIG. 14 is a schematic diagram showing another example of the second method for restoring the function of a PDP according to the present invention. In this example, laser beams are used as lights L to be irradiated. More specifically, laser beams emitted from an excimer laser apparatus 37 are irradiated to the PDP 110, with their linear beam shape maintained using an optical system. A stage 39, on which the PDP 110 is fixedly mounted, moves in directions indicated by arrows so that laser beams L are irradiated all over the PDP 110. The same effect as described in FIG. 13 is achieved through the use of the laser beams L.

Figure 15:
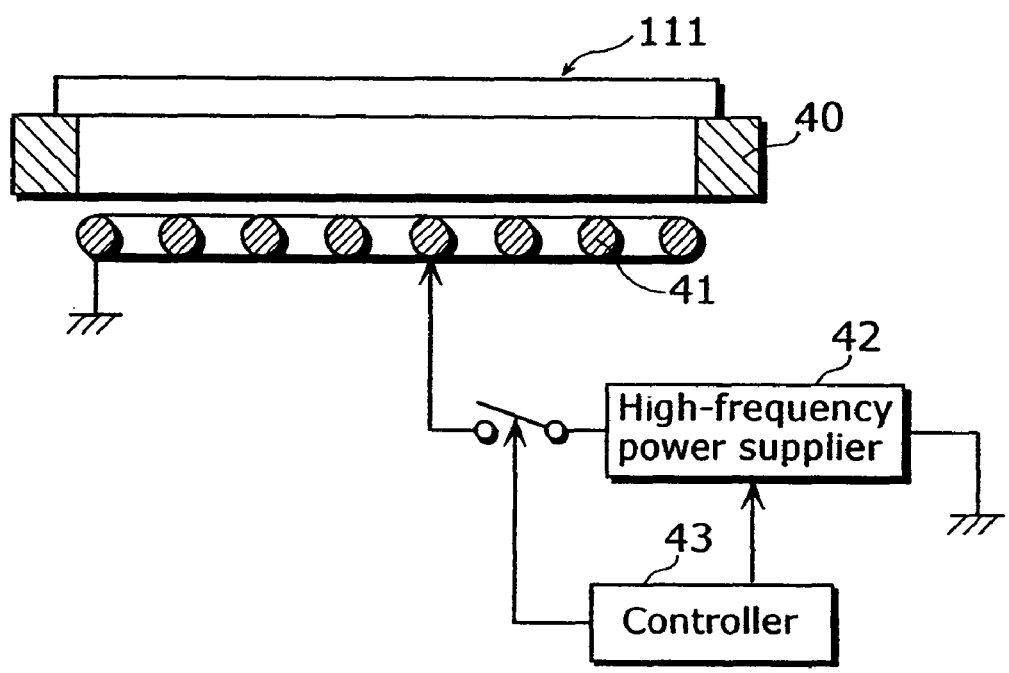
FIG. 15 is a schematic diagram showing a third method for restoring the function of a PDP according to the present invention.

FIG. 15 is a schematic diagram showing a third method for restoring the function of a PDP according to the present invention. The present embodiment requires a condition that phosphor layers of a PDP 111 should be composed of phosphor particles to which conductive particles whose electric resistivity is in the range between 8 $\mu\Omega$cm and 200 $\mu\Omega$cm inclusive are mixed at a predetermined ratio. Here, conductive particles are mixed in a ratio of 0.1 (wt %) to 10 (wt %) with regard to the whole phosphor layers. Moreover, it is preferable to use iron, nickel, or chromium as conductivity particles. Furthermore, the PDP 111 is equipped with the power detection circuit 28, the timer circuit 24, the memory 27, and the control unit 20 shown in FIG. 4, as in the case of the PDP 110 used in the second restoration method.

In this restoration method, as in the case of the above-described second restoration method, a manufacturer collects the PDP 111, when receiving a notification from its user who has contacted such manufacturer as prompted by the screen display, and inductively heats the conductive particles mixed in the phosphor layers by applying a high-frequency electric field to the PDP 111. Accordingly, the phosphor layers are heated and their functions are restored. More specifically, as FIG. 15 shows, the collected PDP 111 is placed onto a tubular base frame 40. Then, by applying high-frequency power from a high-frequency power supplier 42 to spiral heating coils 41 such as IH coils that are placed below the base frame 40, the heating coils 41 generate electromagnetic waves by which a high-frequency electric field is applied to the phosphor layers of the PDP. Accordingly, the conductive particles included in such phosphor layers are inductively heated and generate eddy currents. The phosphor particles included in the phosphor layers are heated by Joule heat caused by such eddy currents, as a result of which the function of the phosphor layers is improved.

Conductive particles are mixed to the phosphor layers with a mixing ratio of 0.1 (wt %) to 10 (wt %), as described above. This is because a mixing ratio of 0.1 (wt %) or less is not enough to inductively heat the PDP 111 and therefore a function restoration of the phosphor layers cannot be performed as desired, whereas a mixing ratio of 10 (wt %) or over leads to a reduction in the number of phosphor particles included in the phosphor layers and therefore the phosphor layers cannot achieve desired luminance.

Furthermore, as conductive particles to be mixed into the phosphor layers, it is preferable to use ones whose electric resistivity is in the range between 8 $\mu\Omega$cm and 200 $\mu\Omega$cm inclusive, as described above. This is because an electric resistivity of 8 $\mu\Omega$cm or less is too low and only a small amount of Joule heat is generated, whereas an electric resistivity of 200 $\mu\Omega$cm or over causes too small induced currents and only a small amount of Joule heat is generated. In other words, the phosphor layers cannot be heated sufficiently in either case.

Furthermore, the high-frequency power supplier 42 supplies, under the control of a controller 43, the heating coils 41 with high-frequency power with which it is possible to apply, to the conductive particles included in the phosphor layers, a high-frequency electric field that is in the range between 10 V/cm and 300 V/cm inclusive. This is because the application of a high-frequency electric field of 10 V/cm or less results in too small induced current and only a small amount of Joule heat is generated, as a result of which the phosphor layers cannot be heated sufficiently. Meanwhile, the application of a high-frequency electric field of 300 V/cm or over is too high and there is a possibility that other constituent elements mounted on the PDP 111 will be damaged.

As the high-frequency power supplier 42, a high-frequency power supplier is selected that applies a high-frequency electric field in the frequency range between 1 KHz and 3 GHz inclusive to the conductive particles included in the phosphor layers. This is because sufficient induction heating cannot be carried out if the frequency of a high-frequency electric field is 1 KHz or lower, whereas a high-frequency power supplier that generates a high-frequency electric field in the frequency range of 3 GHz or higher is costly.

Figure 16:
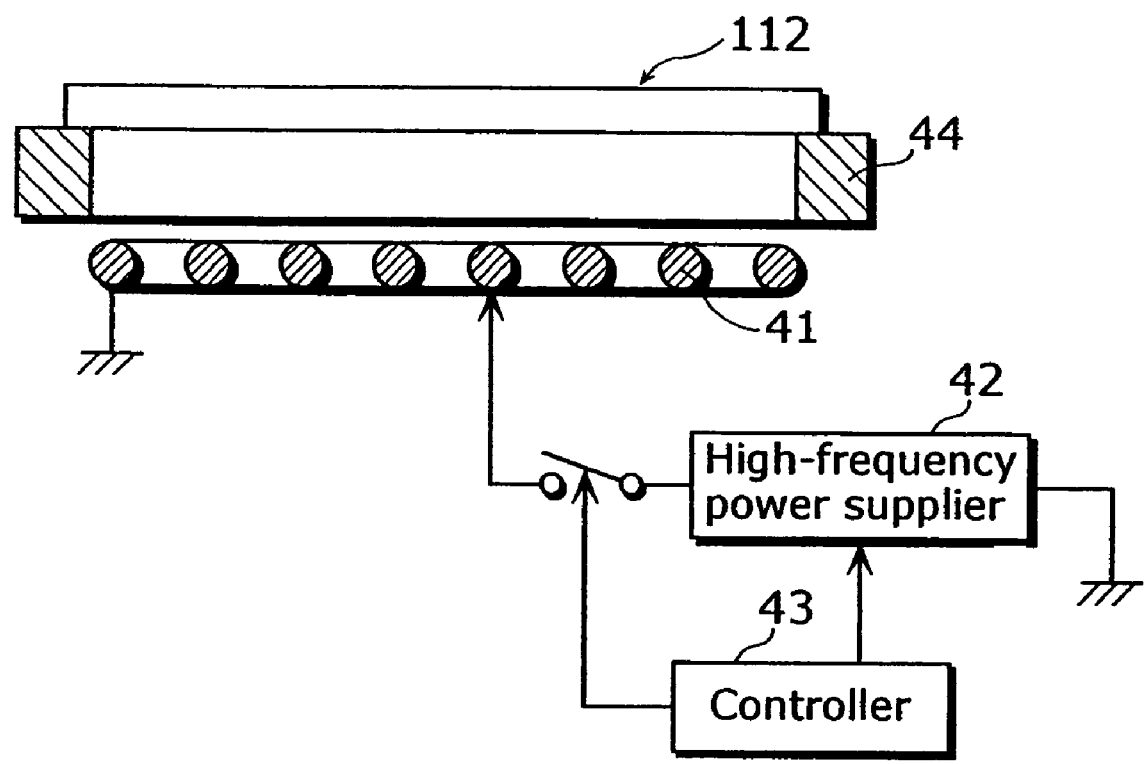
FIG. 16 is a schematic diagram showing a fourth method for restoring the function of a PDP according to the present invention.

In the above-described function restoration method in which the phosphor layers are heated by inductively heating the conductive particles mixed into the phosphor layers through the application of a high-frequency electric field to the phosphor layers, there is an advantage that only a least possible processing energy as well as a shorter processing time is required since only the phosphor layers are heated locally, as in the case of the second restoration method in which lights are irradiated. Furthermore, since a processing time is extremely short, there is no thermal shock on the PDP 111, which causes no possibility that the constituent elements other than the phosphor layers become subject to defects such as the coming off of films and quality degradation. What is more, in addition to this effect, this third restoration method requires only an inexpensive electromagnetic field generation apparatus, while the second restoration method, in which lights are irradiated, requires expensive apparatuses such as the xenon flash lamps 32 and excimer laser apparatus 37. Therefore, the third restoration method is applicable, for example, to IH cooking equipments for household use or larger IH cooking equipments for industrial use, which produces the effect that there is no cost overrun FIG. 16 is a schematic diagram showing a fourth method for restoring the function of a PDP according to the present invention. The fourth restoration method, which is a variation of the third restoration method, is different from the third restoration method only in that, instead of conductive particles that are mixed to the phosphor layers in the third restoration method, phosphor layers of a PDP 112 are composed of phosphor particles to which dielectric particles are mixed in a predetermined ratio, the dielectric particles being made of dielectric materials whose dielectric loss factor fall within the range between 0.01 and 0.6 inclusive when the frequency of a high-frequency electric field to be applied is in the range between 1 KHz to 3 GHz.

The dielectric particles are mixed in a ratio of 0.1 (wt %) to 10 (wt %) with regard to the whole phosphor layers, as in the case of the conductive particles in the third restoration method. As dielectric particles, it is preferable to use dielectric particles whose dielectric loss factor is high and which are highly heat-resistant. For example, lead zirconate titanate is a highly preferable dielectric particle to be mixed to phosphor particles since its dielectric loss factor is 0.04 and it has heat resistance up to 500° C. or over.

Furthermore, the PDP 112 is equipped with the power detection circuit 28, the timer circuit 24, the memory 27, and the control unit 20 shown in FIG. 4, as in the case of the PDPs 100, 110, and 111 used in the first or third restoration method.

In the fourth restoration method, as in the case of the above-described third restoration method, a manufacturer collects the PDP 112, when receiving a notification from its user who has contacted such manufacturer as promoted by the screen display, and as FIG. 16 shows, places the collected PDP 112 onto a support table 44 made of dielectric material. Then, by applying high-frequency power from the high-frequency power supplier 42 to spiral heating coils 41 that are located under such support table 44, the heating coils 41 generate electromagnetic waves by which a high-frequency electric field is applied to the phosphor layers of the PDP 112 via the support table 44. Accordingly, the dielectric particles included in such phosphor layers are inductively heated and generate eddy currents. The phosphor particles included in the phosphor layers are heated by Joule heat caused by such eddy currents, as a result of which the function of the phosphor layers is improved.

Dielectric particles are mixed to the phosphor layers with a mixing ratio of 0.1 (wt %) to 10 (wt %), as described above. This is because a mixing ratio of 0.1 (wt %) or lower is not enough to inductively heat the PDP 112 and therefore a function restoration of the phosphor layers cannot be performed as desired, whereas a mixing ratio of 10 (wt %) or over leads to a reduction in the number of phosphor particles included in the phosphor layers and therefore the phosphor layers cannot achieve desired luminance.

Moreover, the dielectric loss factor of dielectric particles to be mixed into the phosphor layers in relation to the frequency of a high-frequency electric field to be applied is in the range between 0.01 and 0.6. This is because dielectric loss (heating value) W can be represented as $W = \omega \times C_O \times V_O^2 \times \epsilon \times \tan\delta$, where "$\omega$" denotes each frequency of high-frequency power, "$C_o$" denotes the capacitance of dielectric particles, "$V_o$" denotes voltage to be applied to the dielectric particles, "$\epsilon$" denotes the dielectric constant of the dielectric particles, and "$\tan\delta$" denotes the dielectric loss factor of the dielectric particles.

Thus, when the dielectric loss factor is 0.01 or smaller, heating cannot be performed sufficiently since $\tan\delta$ in the above expression is too small and the amount of heat to be generated becomes small, whereas when the dielectric loss factor is 0.6 or larger, accumulated charge of address discharge becomes likely to be dissipated and therefore there arises the possibility that memory effect achieved by address discharge is lost.

Furthermore, the high-frequency power supplier 42 supplies, under the control of a controller 43, the heating coils 41 with high-frequency power with which it is possible to apply, to the dielectric particles included in the phosphor layers, a high-frequency electric field that is in the range between 10 V/cm and 300 V/cm inclusive. This is because the application of a high-frequency electric field of 10 V/cm or less results in too small induced current and only a small amount of Joule heat is generated, as a result of which the phosphor layers cannot be heated sufficiently. Meanwhile, the application of a high-frequency electric field of 300 V/cm or over is too high and there is a possibility that other constituent elements mounted on the PDP 112 will be damaged.

As the high-frequency power supplier 42, a high-frequency power supplier is selected that applies a high-frequency electric field in the frequency range between 1 KHz and 3 GHz inclusive to the dielectric particles included in the phosphor layers. This is because sufficient induction heating cannot be carried out if the frequency of a high-frequency electric field is 1 KHz or lower, whereas a high-frequency power supplier that generates a high-frequency electric field in the frequency range of 3 GHz or higher is costly.

In the above-described function restoration method in which the phosphor layers are heated by inductively heating the dielectric particles mixed into the phosphor layers through the application of a high-frequency electric field to the phosphor layers, there is an advantage that only a least possible processing energy as well as a shorter processing time is required since only the phosphor layers are heated locally, as in the case of the second restoration method in which lights are irradiated. Furthermore, since a processing time is extremely short, there is no thermal shock on the PDP 112, which causes no possibility that the constituent elements other than the phosphor layers become subject to defects such as the coming off of films and quality degradation. What is more, in addition to this effect, this fourth restoration method requires only an inexpensive electromagnetic field generation apparatus, while the second restoration method, in which lights are irradiated, requires expensive apparatuses such as the xenon flash lamps 32 and excimer laser apparatus 37. Therefore, the fourth restoration method is applicable, for example, to IH cooking equipments for household use or larger IH cooking equipments for industrial use, which produces the effect that there is no cost overrun Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A plasma display panel (PDP), comprising
   a first substrate on which discharge electrodes and a first dielectric layer are formed, each of said discharge electrodes generating a display discharge and said first dielectric layer covering the discharge electrodes;
   a second substrate on which the following are formed: address electrodes that are located orthogonally to the discharge electrodes; a second dielectric layer that covers the address electrodes; barrier ribs that are formed on the second dielectric layer; phosphor layers, each being formed in a concave portion between each two neighboring barrier ribs; and heating elements that are located close to the respective phosphor layers;

a timer circuit that measures a panel drive time during which the PDP has been driven;

a memory that stores a total drive time that is obtained by accumulating each panel drive time measured by the timer circuit;

a control unit operable to judge that the total drive time stored in the memory has reached a set time; and a heating element energization circuit that energizes the heating elements based on a result of the judgment by the control unit.

2. The PDP according to claim 1,
wherein the heating elements have a linear shape and are formed on the second substrate, each of the heating elements being located between each two neighboring address electrodes in parallel with said address electrodes and being embedded in the second dielectric layer.

3. The PDP according to claim 1,
wherein the heating elements have a linear shape and are located above the respective address electrodes in parallel with said address electrodes, the heating elements being embedded in the second dielectric layer.

4. The PDP according to claim 1,
wherein each of the heating elements is formed at least as part of each of the barrier ribs.

5. The PDP according to claim 1,
wherein the control unit is operable to direct the heating element energization circuit to energize the heating elements based on the result of the judgment that the total drive time stored in the memory has reached the set time.

6. The PDP according to claim 1, further comprising
a function restoration key by which an instruction for energizing the heating elements is inputted, said key being operated manually,
wherein the control unit is operable to indicate that an operation of the function restoration key should be performed, based on the result of the judgment that the total drive time stored in the memory has reached the set time, and
the heating element energization circuit energizes the heating elements through a user's operation on the function restoration key based on the result of the judgment by the control unit.

7. The PDP according to claim 1, further comprising
a control drive circuit that controls drive of the discharge electrodes and the address electrodes,
wherein the heating element energization circuit controls energization of the heating elements so that said heating elements heat the phosphor layers at a predetermined temperature for a predetermined time.

8. The PDP according to claim 7,
wherein the heating element energization circuit controls the energization of the heating elements so that the phosphor layers are heated at 400° C. to 800° C., for 10 to 120 minutes.

* * * * *